United States Patent [19]

Hattori et al.

[11] 4,128,998
[45] Dec. 12, 1978

[54] OVERHEAT PREVENTING SYSTEM FOR EXHAUST GAS PURIFIER OF VEHICLES

[75] Inventors: Tadashi Hattori, Nishio; Takamichi Nakase, Gamagori; Hideo Tsubouchi; Toshiharu Iwata, both of Okazaki, all of Japan

[73] Assignee: Nippon Soken, Inc., Nishio, Japan

[21] Appl. No.: 764,985

[22] Filed: Feb. 2, 1977

Related U.S. Application Data

[62] Division of Ser. No. 371,880, Jun. 20, 1973, Pat. No. 4,012,906.

[30] Foreign Application Priority Data

Jun. 26, 1972 [JP] Japan .................................. 47-63896
Jul. 26, 1972 [JP] Japan .................................. 47-75399
Jul. 26, 1972 [JP] Japan .................................. 47-75400
Jul. 26, 1972 [JP] Japan .................................. 47-75401
Jul. 31, 1972 [JP] Japan .................................. 47-77155

[51] Int. Cl.² ............................................. F01N 3/15
[52] U.S. Cl. ....................................... 60/277; 60/285; 60/288

[58] Field of Search .................... 60/277, 288, 285

[56] References Cited

U.S. PATENT DOCUMENTS 3,908,366  11/1975  Masaki ................................. 60/288
3,916,622  11/1975  Gospodar ............................. 60/285

Primary Examiner—Douglas Hart
Attorney, Agent, or Firm—Cushman, Darby & Cushman

[57] ABSTRACT

An overheat preventing system is provided for a vehicle exhaust gas purifier. The system comprises a temperature detector mounted in the locality of each of the exhaust ports of an engine, an overheat detector for detecting failure of an engine to fire from the temperature signals generated by the temperature detectors and for generating a signal, and an actuator for preventing the overheating of an exhaust gas purifier which is adapted to be operated upon the generation of the overheat signal from the overheat detector, whereby unburned gases are prevented from flowing into the exhaust gas purifier.

16 Claims, 22 Drawing Figures

WAVEFORM AT POINT (i)

OVERHEAT PREVENTING SYSTEM FOR EXHAUST GAS PURIFIER OF VEHICLES

RELATED APPLICATION

This application is a division of our copending application Ser. No. 371,880, filed June 20, 1973, now U.S. Pat. No. 4,012,906.

BACKGROUND OF THE INVENTION

FIELD OF THE INVENTION

The present invention relates to an overheating prevention system for an exhaust gas purifier installed in a vehicle or the like.

Conventional devices designed to oxidize exhaust gases of an engine which have passed the exhaust valves and thereby accomplish a high degree of purification of the exhaust gases include a manifold reactor, afterburner, catalytic converter and so on. However, these conventional devices have the disadvantage in that is is difficult in ensure a stable and continuous burning of the exhaust gases under varying various engine operating conditions and that the occurrence of any excessive burning tends to raise the temperature in the burning chamber to over 1000° C. in the case of the manifold reactor and afterburner and over 700° C. in the case of the catalytic converter and such high temperatures tend to cause the destruction of the devices. For this reason, various methods have been attempted with these prior art devices, wherein the exhaust gases are exhausted through a bypass circuit or the supply of secondary air is interrupted in accordance with the detected temperature within the purifier devices thereby restraining the reaction to effect the desired temperature control.

The prior art devices constructed as described above are still disadvantageous in that a delay time of several seconds is involved in the operation of the temperature detectors, bypass circuit, actuator and the like so that if, in the catalystic converter system for example, unburned gases resulting from misfiring of any spark plug are admitted into the purifier, these unburned gases react explosively and it is thus impossible to prevent the occurrence of overheating that involves a rapidly accelerating rise of the temperature in the device, thereby giving rise to thermal destruction or deterioration of the purifier or a reduced purifying performance. These deficiencies have been important obstacles in the realization of a greater safety and practical devices.

It is conceivable that these deficiencies of the prior attempts stem from the fact that the temperature in a purifier is detected to thereby prevent overheating of the purifier. In other words, at the time when the temperature is detected, the unburned gases have already been admitted into the purifier and therefore subsequent actuation of any overheat preventing means can hardly prevent the reaction of those unburned gases which have actually been admitted into the device as well as unburned gases which are about to be admitted into the device. Consequently, with such control methods, no improvement in the response characteristic of the temperature detectors, actuator and the like can prevent unburned gases resulting from failure of the engine to fire from reacting explosively within the purifier and thus giving rise to overheating that causes a rapidly accelerating rise of the temperature in the purifier. It is thus impossible to prevent thermal destruction or deterioration of the purifier or deterioration in the performance of the device.

SUMMARY OF THE INVENTION

It is therefore an object of the present invention to provide an overheat preventing system which overcomes the foregoing difficulties and which prevents thermal destruction or deterioration of a purifier or deteriorated performance thereof.

The present invention stems from the recognition of the phenomenon that the temperature in the locality of the exhaust ports rapidly drops to a low temperature upon occurrence of a misfire. The present invention thus comprises a temperature detector inserted in the locality of the exhaust port of each of the cylinders, an overheat detector provided for detecting the occurrence of a misfire from the temperature signals generated from the temperature detectors to produce a signal, and an actuator for preventing overheating of an exhaust gas purifier which is adapted to come into operation upon the generation of an overheat signal from the overheat detector so as to prevent unburned gases from entering into the exhaust gas purifier.

DESCRIPTION OF THE PREFERRED EMBODIMENTS

EMBODIMENT 1

Figure 1:
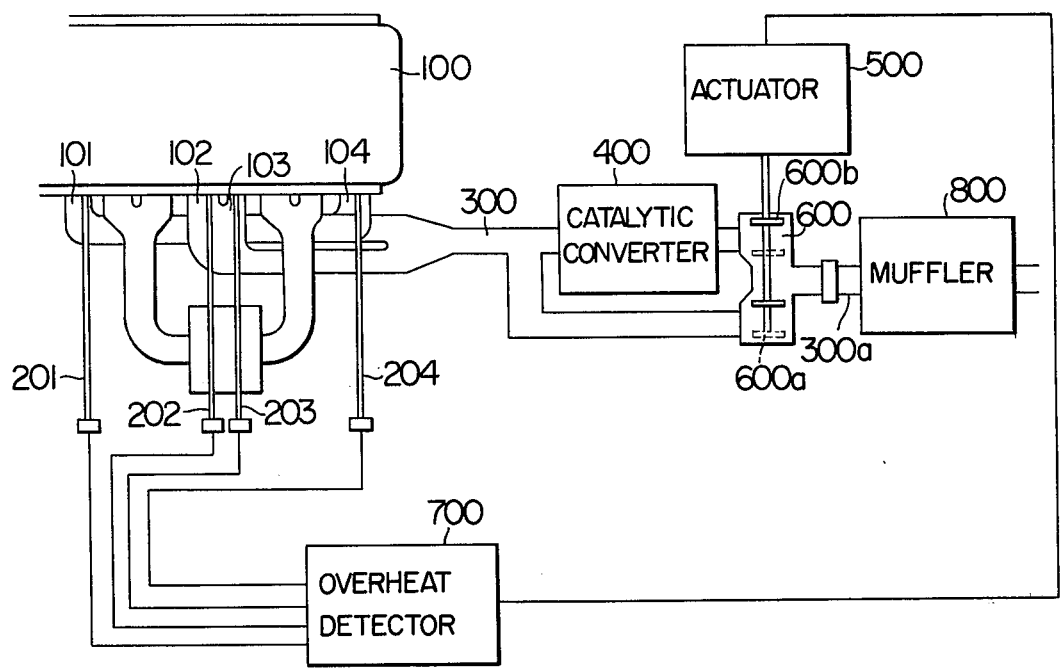
FIG. 1 is a system diagram showing an embodiment of an overheat preventing system according to the present invention.

The construction of the first embodiment of the overheat preventing system according to the present invention will be described with reference to FIGS. 1 through 5 taking the example of a catalytic converter system. In FIG. 1, the exhaust gases from an engine 100 are exhausted to an exhaust pipe 300 through exhaust ports 101, 102, 103 and 104. The exhaust pipe 300 is divided into two branches one of which is connected to the inlet of a catalytic converter 400 and the other branch is connected directly to the inlet of a bypass valve 600. The outlet of the converter 400 is connected to the catalyst side inlet of the bypass valve 600 and the outlet of the bypass valve 600 is connected to a muffler 800 through an exhaust pipe 300a. Temperature detectors 201, 202, 203 and 204 which are for example of the thermocouple type and which are adapted respectively to detect the temperature of exhaust gases in the locality of the engine exhaust ports 101, 102, 103, and 104, are connected to an overheat detector 700 and an actuator 500 is brought into operation by the output signal of the overheat detector 700 to control the bypass valve 600.

In the normal condition, the catalyst side of the bypass valve 600 is open as shown by numeral 600b, so that the exhaust gases from the engine 100 are exhausted to the muffler 800 through the catalytic converter 400. On the other hand, if any of the spark plugs in the engine 100 fails to fire, unburned gases will flow into the catalytic converter 400 where the unburned gases react explosively giving rise to an overheat phenomenon. Therefore, in order to prevent the flow of unburned gases into the catalytic converter 400 upon occurrence of a misfire, utilizing the phenomenon that the temperature of exhaust gases in the locality of the exhaust port 101, 102, 103 or 104 in the engine cylinder which failed to fire tends to drop at a rapidly accelerating rate, the rate of change of exhaust gas temperature is detected to thereby produce a temperature gradient signal from which the overheat detector 700 detects the occurrence of an overheat and applies a signal to the actuator 500. This brings the actuator 500 into operation so that the bypass valve 600 is moved to the bypass side shown by numeral 600a. In this way, should a misfire occur, the unburned gases from the engine 100 are bypassed around the catalytic converter 400 to protect it from the danger of overheating.

Figure 3:
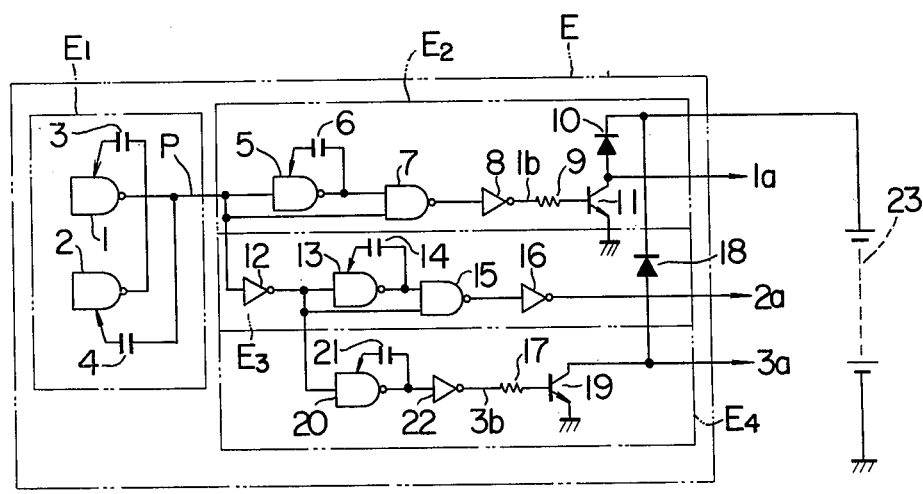
FIG. 3 is an electrical wiring diagram of the clock pulse generating circuit employed in the overheat detector shown in FIG. 2.
Figure 2:
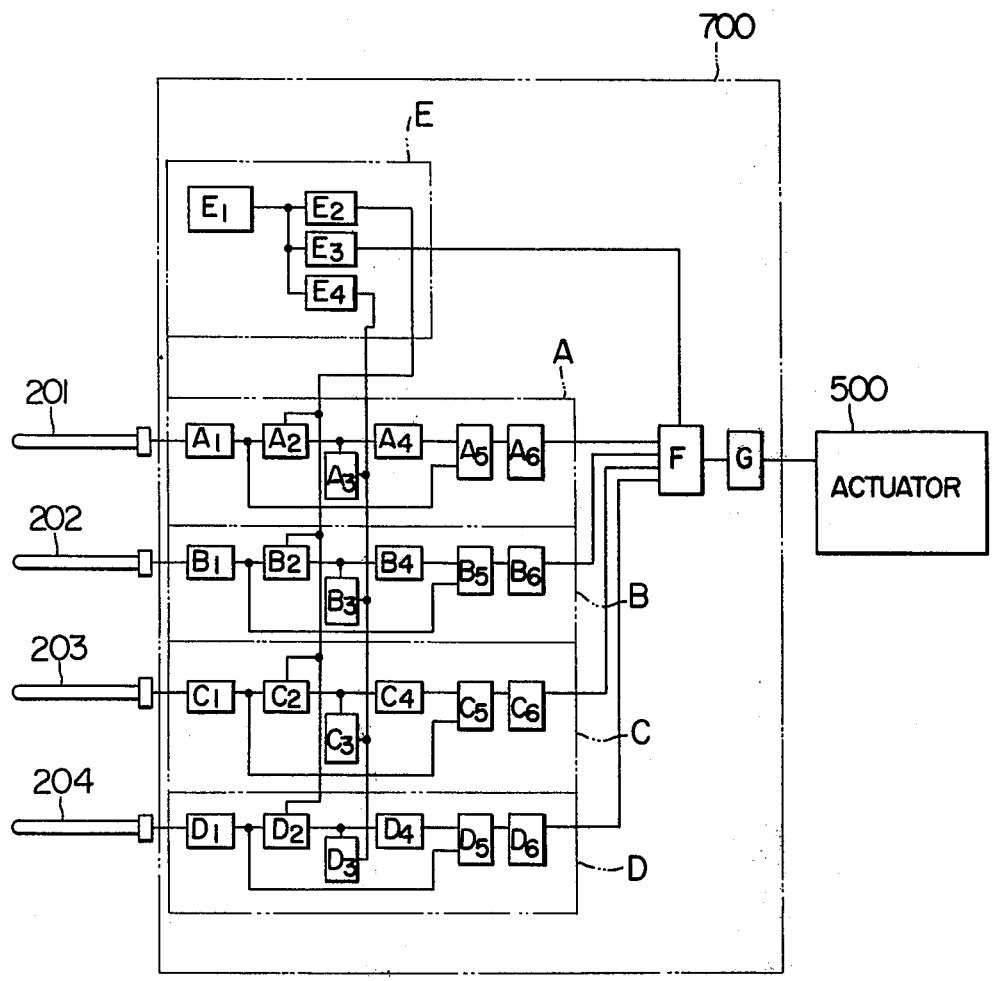
FIG. 2 is a block diagram of the overheat detector employed in the embodiment shown in FIG. 1.
Figure 4:
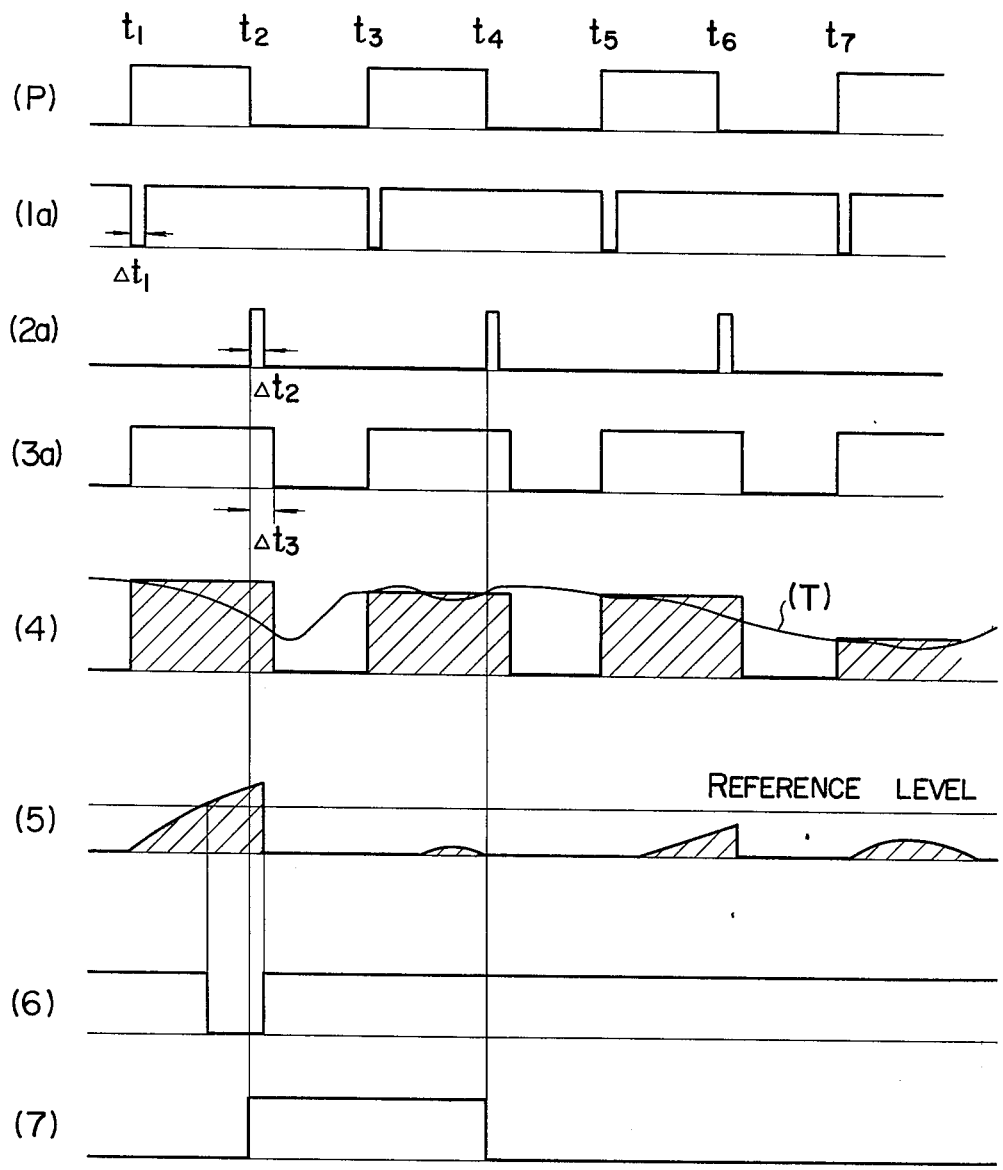
FIG. 4 is a time chart showing the output waveforms generated at various points in the overheat detector shown in FIG. 2.
Figure 5:
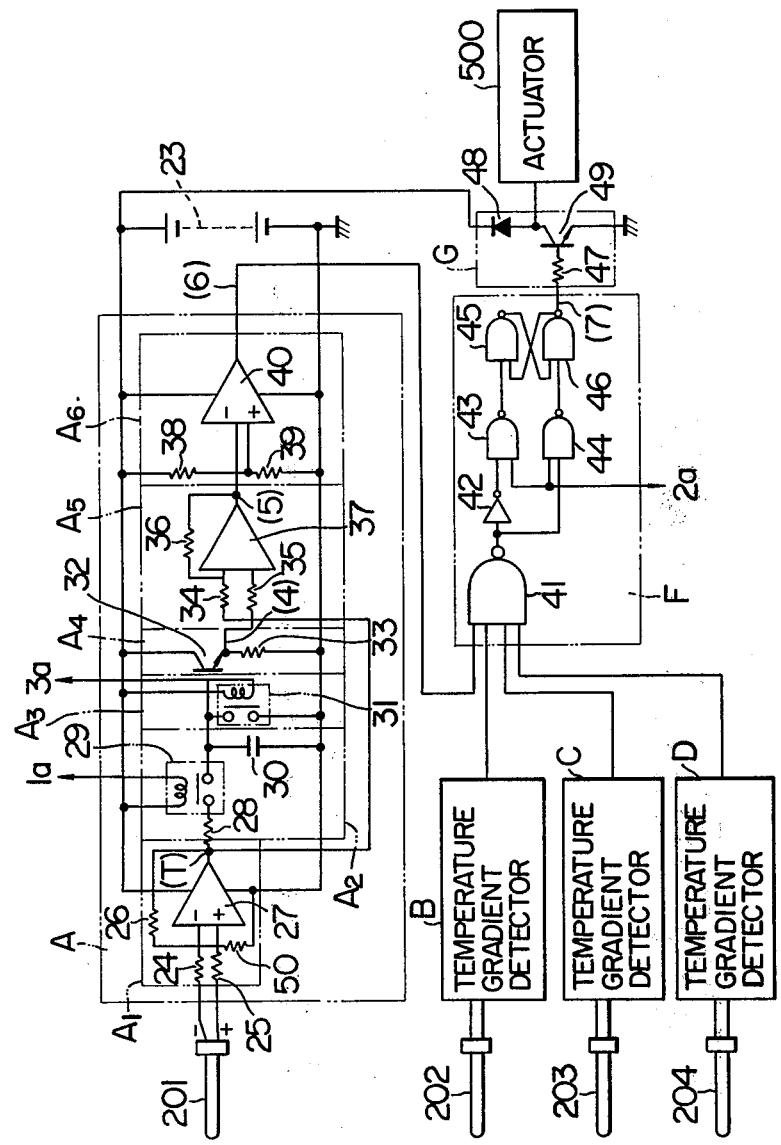
FIG. 5 is an electrical wiring diagram for the overheat detector of FIG. 2 excluding the clock pulse generating circuit shown in FIG. 3.

FIG. 2 illustrates a block diagram of the electronic circuit of the overheat detector 700. FIG. 3 illustrates a wiring diagram of a clock pulse generating circuit E of the overheat detector 700, FIG. 4 illustrates a time chart showing the output waveforms of the various circuits, and FIG. 5 illustrates a wiring diagram of temperature gradient detecting circuits A, B, C and D, a logical circuit F and a power circuit G of the overheat detector 700. Referring first to FIG. 2, the clock pulse generating circuit E comprises an oscillating circuit $E_1$ [the output waveform is shown in FIG. 4-(P)], a gating signal circuit $E_2$ [the output waveform is shown in FIG. 4-(1a)], a temperature change rate detecting signal circuit $E_3$ [the output waveform is shown in FIG. 4-(2a)] and a reset signal circuit $E_4$ [the output signal is shown in FIG. 4-(3a)]. As mentioned earlier, numerals 201, 202, 203 and 204 designates the temperature detectors of the thermocouple type. Symbols A, B, C and D designate temperature gradient detecting circuits for detecting the temperature signals from the associated temperature detectors 201, 202, 203 and 204 and the detectors A, B, C and D are identical in construction.

Only the block diagram of the temperature gradient detecting circuit A will be described as an example of the temperature gradient detecting circuits A, B, C and D. The temperature gradient detecting circuit A comprises an amplifier circuit $A_1$ for amplifying the temperature signal from the temperature detector 201, a memory circuit $A_2$ for storing the amplified temperature signal as a signal synchronized with the gating signal (1a) produced by the gating signal circuit $E_2$, a discharge circuit $A_3$ for discharging the stored signal by the reset signal (3a) produced by the reset signal circuit $E_4$, an emitter-follower circuit $A_4$ for subjecting the discharged signal to impedance transformation so that the stored signal discharging resistor in the preceeding stage is made negligible, a differential amplifier circuit $A_5$ for amplifying the difference signal of the stored signal and the signal subsequent to the amplifier circuit $A_1$, and a level detecting circuit $A_6$ for detecting the difference voltage signal level. The output of the level detecting circuit $A_6$ is connected to the logical circuit F where each of the signals from the temperature gradient detecting circuit A, B, C and D including the above-constructed temperature gradient detecting circuit A for respectively detecting the output signals of the temperature detectors 201, 202, 203 and 204, is discriminated whether it indicates overheat or not each time the temperature change rate detecting signal (2a) arrives from the temperature change rate detecting signal circuit $E_3$. Also connected to the logical circuit F is the power circuit G for operating the actuator 500 when the occurrence of an overheat is confirmed from the output signal of the logical circuit F.

The detailed circuit construction of the individual circuits will be described. In FIG. 3, the oscillating circuit $E_1$ in the clock pulse generating circuit E comprises a multivibrator composed of two NAND gates 1 and 2 with an expander terminal and two capacitors 3 and 4 and its output signal (P) is the waveform shown in FIG. 4-(P). The clock pulses are supplied to the gating signal circuit $E_2$, the temperature change rate detecting signal circuit $E_3$ and the reset signal circuit $E_4$. The gating signal circuit $E_2$ comprises a delay circuit composed of a NAND gate 5 provided with an expander terminal and a delaying capacitor 6, and the logical operation is performed on this signal and the signal (P) by means of NAND gate 7. Numeral 8 designates a NOT gate, 9 a base resistor, 10 a protective diode, 11 a transistor. The gating signals ($1a$) [the waveform of FIG. 4-($1a$)] are supplied to the respective relays in the memory circuits $A_2$, $B_2$, $C_2$ and $D_2$. The temperature change rate detecting signal circuit $E_3$ comprises two NOT gates 12 and 16, a NAND gate 13 provided with an expander terminal, a delaying capacitor 14 and a NAND gate 15, so that the temperature change rate detecting signals ($1a$) [the waveform of FIG. 4-($1a$)] are applied to two NAND gates 43 and 44 (shown in FIG. 5) in the logical circuit F. The reset signal circuit $E_4$ comprises a NAND gate 20 provided with an expander terminal, a delaying capacitor 21, a NOT gate 22, a base resistor 17, a protective diode 18, and a transistor 19, and the reset signals ($3a$) [the waveform of FIG. 4-($3a$)] are applied to the respective relays in the discharging circuits $A_3$, $B_3$, $C_3$ and $D_3$. Numeral 23 designates a battery.

In FIG. 5, an inverting input resistor 24 is connected to the inverting input of a differential amplifier 27 in the amplifier circuit $A_1$ and noninverting input resistors 25 and 50 are connected to the noninverting input of the differential amplifier 27. Numeral 26 designates a feedback resistor. If the values of the resistors 24, 25, 26 and 50 are represented as $R_1$, $R_2$, $R_3$ and $R_4$ and if $R_1 = R_2$ and $R_3 = R_4$, then the gain of the differential amplifier 27 is given as $R_3/R_1$. The positive side of the thermo-electromotive force output of the temperature detector 201 is connected to the resistor 25 and the negative side is connected to the resistor 24. The output of the temperature detector 201 is amplified in the amplifier circuit $A_1$ and it is then applied to the memory circuit $A_2$. The memory circuit $A_2$ comprises a resistor 28, a relaty 29 and a capacitor 30 so that the relay 29 is energized each time the gating signal ($1a$) changes to the "0" level (at $t_1$, $t_3$, $t_5$ and $t_7$ in FIG. 4) and consequently an amplified signal (T) is charged through the resistor 28 thereby storing the amplified signal in the memory circuit $A_2$ at each of the times $t_1$, $t_3$, $t_5$ and $t_7$. In this case, the values of the resistor 28 and the capacitor 30 are chosen so that the amplified signal can be stored properly within the pulse width $\Delta t_1$ of the gating signal ($1a$). The signal thus stored is discharged when a relay 31 in the discharging circuit $A_3$ is energized every time the reset signal ($3a$) changes to the "0" level (at $t_2 + \Delta t_3$, $t_4$ 30 $\Delta t_3$, $t_6 + \Delta t_3$). The stored signal is subjected to impedance transformation through the emitter-follow circuit $A_4$ comprising a transistor 32 and a resistor 33. The output waveform of the stored signal is shown in FIG. 4-(4). Designated as (T) is the amplified signal of the thermocouple electromotive force. The stored signal [the waveform of (4)] is applied to a noninverting input resistor 35 of the differential amplifier 37 in the differential amplifier circuit $A_5$. The amplified signal (T) is applied to an inverting input resistor 34. The waveform of the differential amplified signal of the input signals (4) and (T) is shown in FIG. 4-(5).

In the level detecting circuit $A_6$, numerals 38 and 39 designate dividing resistors which determine a reference voltage level. The reference voltage is applied to the noninverting input of a differential amplifier 40 and the differential amplified signal the waveform of (5) is applied to the inverting input. The output waveform of the level detecting circuit $A_6$ is shown in FIG. 4-(6) and the signal changes to the "0" level when the differential amplified signal [the waveform of (5)] becomes higher than the reference level. The output signal of the temperature gradient detecting circuits A, B, C and D receiving the temperature signals from the temperature detectors 201, 202, 203 and 204 are applied to the logical circuit F. The logical circuit F comprises NAND gates 41, 43, 44 and a NOT gate 42 as well as a R-S flip-flop circuit which is composed of NAND gates 45 and 46. The output of the temperature gradient detecting circuits A, B, C and D are applied to the NAND gate 41 included in the logical circuit F. In the normal condition, the output of the temperature gradient detecting circuits A, B, C and D are at the "1" level and consequently the output of the NAND gate 41 is placed at the "0" level. When the temperature change rate detecting signal ($2a$) is at the "1" level, the output of the logical circuit F is at the "0" level. When the temperature change rate detecting signal ($2a$) is at the "0" level, the two inputs of the R-S flip-flop circuit are at the "1" level and therefore the flip-flop circuit remains in the state previously assumed. However, if one or more of the outputs of the temperature gradient detecting circuits A, B, C and D change to the "0" level, that is, the temperature gradient increases, when the temperature change rate detecting signal ($2a$) is at the "1" level, the two inputs of the R-S flip-flop change their states causing the output of the logical circuit F to change to the "1" level, whereas when the temperature change rate detecting signal ($2a$) is at the "0" level, both of the two inputs of the R-S flip-flop are at the "1" level and therefore the R-S flip-flop remains in the previously assumed state. The output of the logical circuit F is applied to the power circuit G. The power circuit G comprises a base resistor 47, a protective diode 48 and a transistor 49, whereby when the output of the logical circuit F is at the "0" level, that is, when the occurrence of overheat is not confirmed, the transistor 49 is in the off state and thus no signal is applied to the actuator 500, with the bypass valve 600 being moved to the side indicated by numeral 600$b$ in FIG. 1 thereby bypassing no exhaust gases. Whereas when the output of the logical circuit F is at the "1" level, that is, when the occurrence of overheat is confirmed, the transistor 49 is driven into the on state and thus the actuator 500 is operated thereby moving the bypass valve 600 to the side indicated by numeral 600$a$ and bypassing the exhaust gases. The output waveform of the logical circuit F is shown in FIG. 4-(7).

EMBODIMENT 2

The second embodiment of the present invention is identical with the first embodiment except for the construction of the overheat detector 700. Accordingly, only the overheat detector 700 will now be described in detail with reference to FIGS. 6 to 8.

Figure 6:
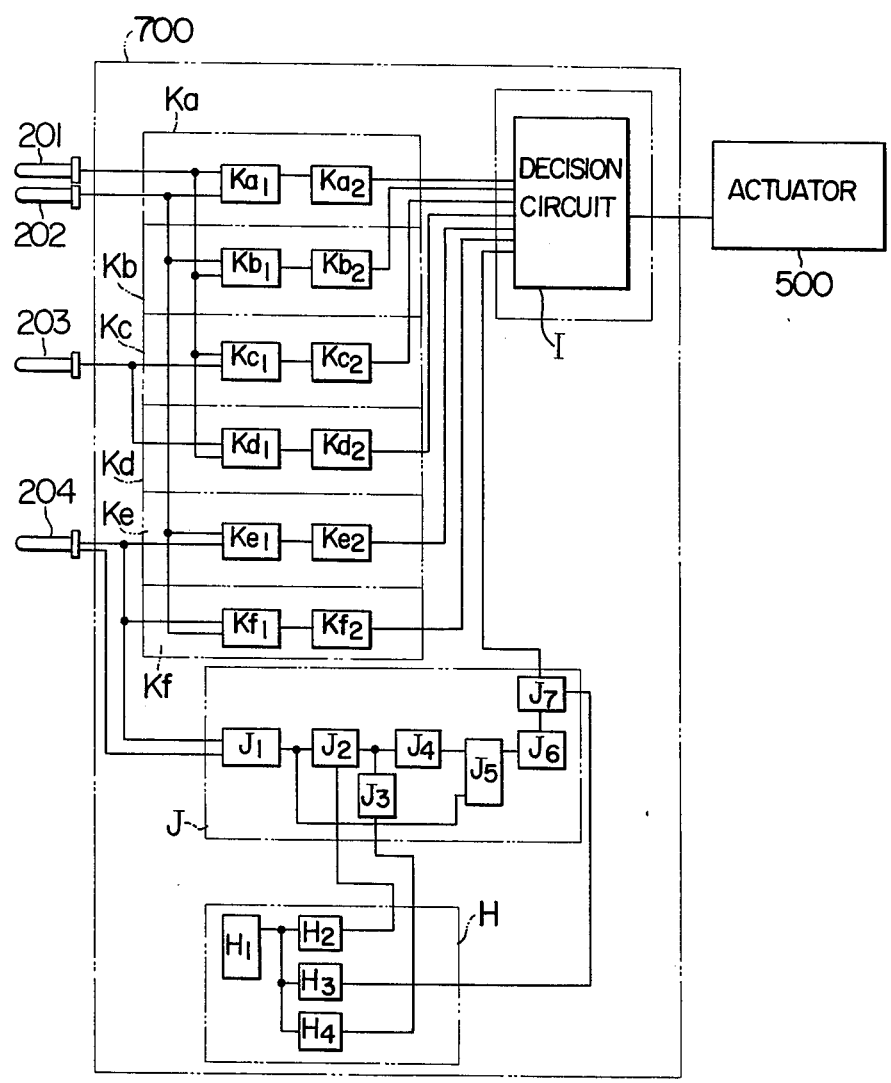
FIG. 6 is a block diagram of the overheat detector employed in a second embodiment of the invention.

In FIG. 6 illustrating the block diagram of the overheat detector 700, $K_a$, $K_b$, $K_c$, $K_d$, $K_e$ and $K_f$ designate temperature difference detecting circuits, $K_{a1}$, $K_{b1}$, $K_{c1}$, $K_{d1}$, $K_{e1}$ and $K_{f1}$ amplifier circuits, $K_{a2}$, $K_{b2}$, $K_{c2}$, $K_{d2}$, $K_{e2}$ and $K_{f2}$ level detecting circuits. Symbol J designates a temperature gradient detecting circuit, $J_1$ an amplifier circuit, $J_2$ a memory circuit, $J_3$ a discharging circuit, $J_4$ an emitter-follower circuit, $J_5$ a level detecting circuit, $J_7$ a decision circuit. Symbol H designates a clock pulse generating circuit, $H_1$ an oscillating circuit, $H_2$ a gating signal circuit, $H_3$ a temperature change rate detecting circuit, $H_4$ a reset signal circuit. Symbol I designates a decision circuit.

Figure 7:
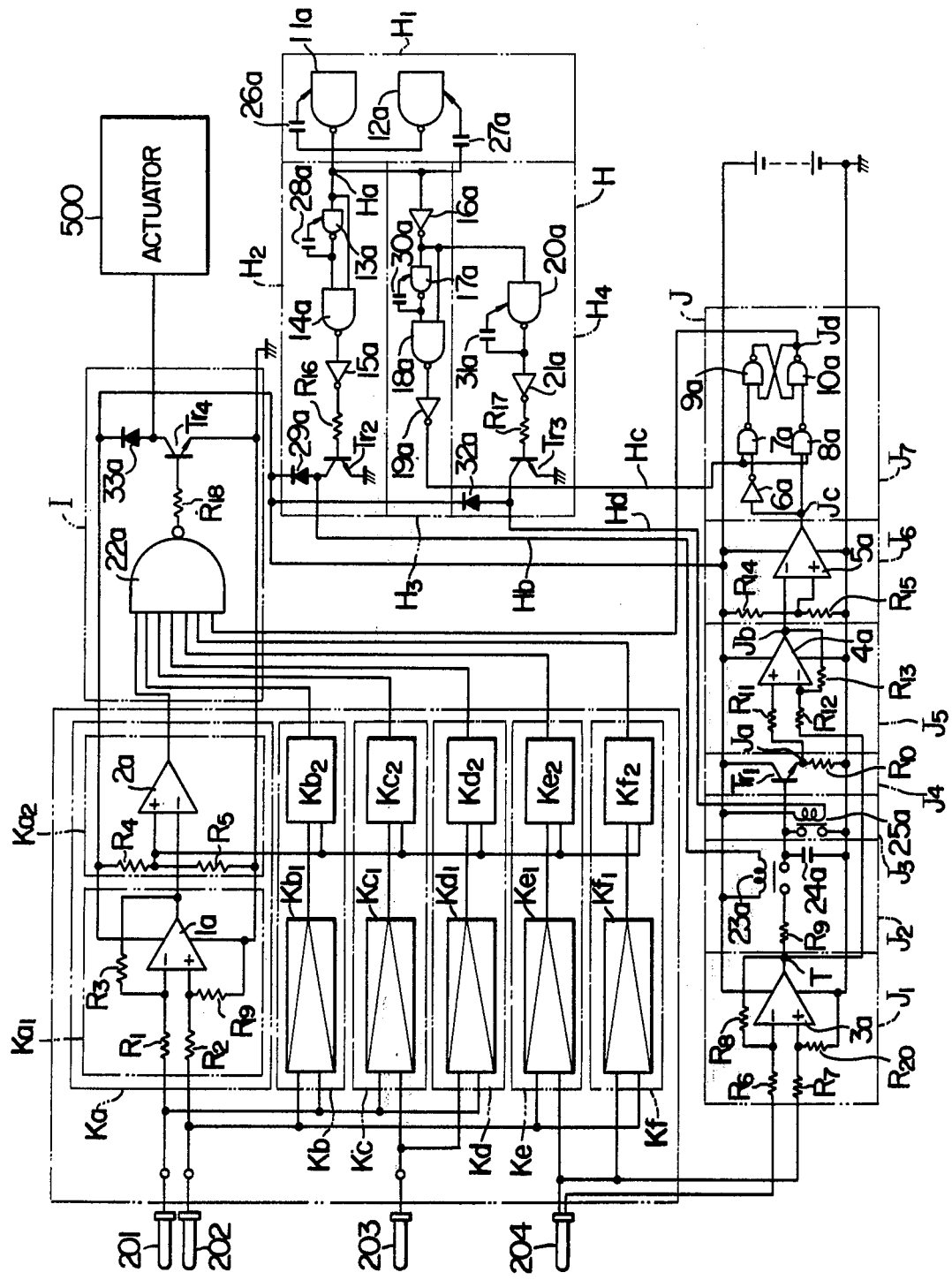
FIG. 7 is a detailed electrical wiring diagram of the overheat detector shown in FIG. 6.

The detailed circuit construction of the overheat detector 700 will now be described. In FIG. 7, the amplifier circuit $K_{a1}$ comprises an inverting input resistor $R_1$, noninverting input resistors $R_2$ and $R_{19}$, a feedback resistor $R_3$, and a differential amplifier 1a, and the temperature detector 201 is connected to the inverting input resistor $R_1$ and the temperature detector 202 is connected to the noninverting input resistor $R_2$. If the values of the resistors $R_1$, $R_2$, $R_{19}$ and $R_3$ are represented as $r_1$, $r_2$, $r_3$, $r_4$ and if $r_1 = r_2$ and $r_3 = r_4$, then when the thermoelectromotive force of the temperature detector 202 is greater than that of the temperature detector 201, the input is amplified with the gain of $R_3/R_1 = r_3/r_1$ with a resultant increase in the output level. Similarly, the output level of the amplifier circuits $K_{b1}$, $K_{c1}$, $K_{d1}$, $K_{e1}$ and $K_{f1}$ increases when the thermoelectromotive force of the temperature detectors connected to the inverting input resistors decreases. The level detecting circuit $K_{a2}$ comprises a differential amplifier 2a, and reference voltage level setting dividing resistors $R_4$ and $R_5$, and the dividing point is connected to the noninverting input of the differential amplifier 2a and the output of the amplifier circuit $K_{a1}$ is connected to the inverting input. When the output level of the amplifier circuit $K_{a1}$ exceeds the reference level, the output of the level detecting circuit $K_{a2}$ assumes to "0" level. The output of the level detecting circuit $K_{a2}$ is applied to the decision circuit I. The amplifier circuits $K_{b2}$, $K_{c2}$, $K_{d2}$, $K_{e2}$ and $K_{f2}$ are of the similar construction and their outputs are also applied to the decision circuit I.

Figure 8:
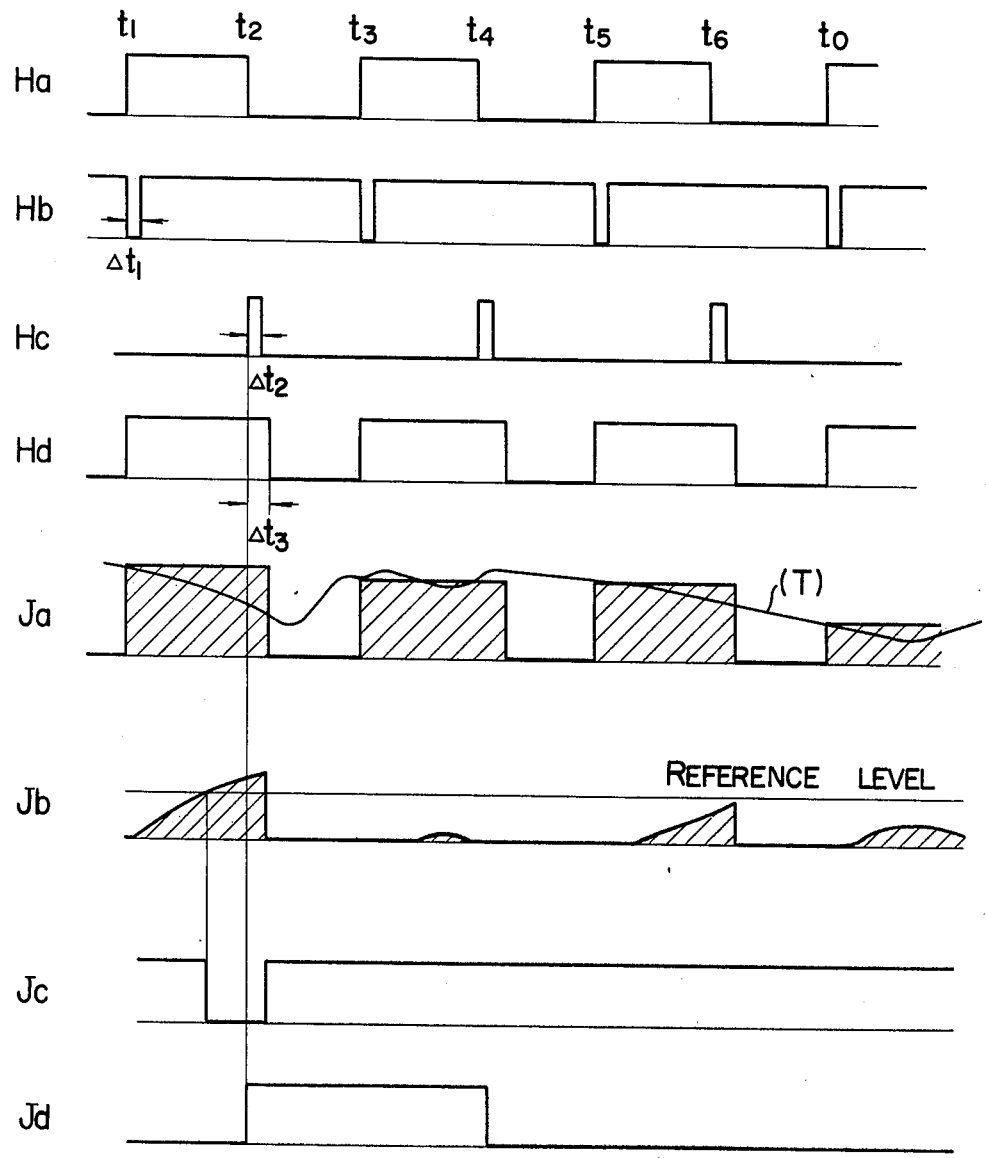
FIG. 8 is a time chart showing the output waveforms generated at various points in the overheat detector shown in FIG. 6.

The oscillating circuit $H_1$ in the clock pulse generating circuit H comprises capacitors 26a and 27a and NAND gates 11a and 12a with an expander terminal and the clock pulse waveform is shown in FIG. 8-Ha. The gating signal circuit $H_2$ comprises a delay circuit composed of a capacitor 28a and a NAND gate 13a with an expander terminal, a NAND gate 14a, an inverter 15a, a base resistor $R_{16}$, a protective diode 29a and a transistor $T_{r2}$ and the gating signals (FIG. 8-$H_b$) are applied to a relay 23a. The temperature change rate detecting circuit $H_3$ comprises a delay circuit composed of a capacitor 30a and a NAND gate 17a with an expander terminal, inverters 16a and 19a and a NAND gate 18a, and the temperature change rate detecting signals (FIG. 8-$H_c$) are supplied to a relay 25a. The reset signal circuit $H_4$ comprises a capacitor 31a, a NAND gate 20a with an expander terminal, an inverter 21a, a base resistor $R_{17}$, a protective diode 32a and a transistor $T_{r3}$, and the reset signals (FIG. 8-$H_d$) are supplied to NAND gates 7a and 8a.

In the temperature gradient detecting circuit J provided to meet a situation involving failure of all the cylinders to fire, the amplifier circuit $J_1$ comprises an inverting input resistor $R_6$, noninverting input resistors $R_7$ and $R_{20}$, a feedback resistor $R_8$ and a differential amplifier 3a, and the positive side of the temperature detector 204 is connected to the noninverting input resistor $R_7$ and the negative side is connected to the inverting input resistor $R_6$. If the values of the resistors $R_6$, $R_7$, $R_8$ and $R_{20}$ are represented as $r_1$, $r_2$, $r_3$ and $r_4$ and if $r_1 = r_2$ and $r_3 = r_4$, then the thermoelectromotive force of the temperature detector 204 is amplified with the gain of $R_8/R_6$ and the output of the amplifier circuit $J_1$ is applied to the memory circuit $J_2$. The memory circuit $J_2$ comprises a resistor $R_9$, the relay 23a and a capacitor 24a, whereby when the gating signal $H_b$ changes to the "0" level ($t_1$, $t_3$, $t_5$, $t_7$), the relay 23a is operated and thus an amplified signal T is stored in the memory circuit $J_2$. In this way, the amplified signal T at each of the times $t_1$, $t_3$, $t_5$ and $t_7$ is stored in the memory. In this case, the values of the resistor $R_9$ and the capacitor 24a are selected so that the amplified signal can be charged properly within the duration of the pulse width $t_1$ of the gating signal $H_b$. The stored signal is discharged when the relay 25a in the discharging circuit $J_3$ is operated for each "0" level ($t_2 + \Delta t_3$, $t_4 + \Delta t_3$, $t_6 + \Delta t_3$) of the reset signal $H_d$. The stored signal is subjected to impedance transformation through the emitter-follower circuit $J_4$ comprising a transistor $T_{r1}$ and a resistor $R_{10}$ and the generated output waveform is shown in FIG. 8-Ga. The amplifier circuit $J_5$ comprises a noninverting input resistor $R_{11}$, an inverting input resistor $R_{12}$, a feedback resistor $R_{13}$ and a differential amplifier 49. The output of the emitter-follower circuit $J_4$ is connected to the noninverting input resistor $R_{11}$ and the output of the amplifier circuit $J_1$ is connected to the inverting input resistor $R_{12}$ so that the output (FIG. 8-$G_b$) of the amplifier circuit $J_5$ increases when a misfire occurs. The level detecting circuit $J_6$ comprises reference voltage level setting dividing resistors $R_{14}$ and $R_{15}$ and a differential amplifier 5a, and the dividing point is connected to the noninverting input and the output of the amplifier $J_5$ is connected to the inverting input. When a misfire occurs so that the temperature change rate increases and thus the output of the amplifier circuit $J_5$ exceeds the reference level, the output of the level detecting circuit $J_6$ changes to the "0" level. The decision circuit $J_7$ comprises NAND gates 9a and 10a forming a R-S flip-flop, an inverter 6a and NAND gates 7a and 8a. In the normal condition, that is, when the temperature change rate is low, the output $J_c$ of the level detecting circuit $J_6$ is at the "1" level. Consequently, when the temperature change rate detecting signal $H_c$ is at the "1" level, the output $J_d$ of the R-S flip-flop is at the "1" level, whereas the output $J_d$ of the R-S flip-flop retains its previously assumed state even when the temperature change rate detecting signal $H_c$ is at the "0" level. On the other hand, when the temperature change rate is high, that is, when a misfire occurs, the output $J_c$ changes to the "0" level. Thus, when the temperature change rate detecting signal $H_c$ is at the "1" level, the output $J_d$ changes to the "0" level, whereas even when the temperature change rate detecting signal $H_c$ is at the "0" level, the two inputs of the R-S flip-flop are at the "1" level and therefore the output $J_d$ remains at the "0" level. The decision circuit I comprises a NAND gate 22a, a base resistor $R_{18}$, a protective diode 33a and a transistor $T_{r4}$. The NAND gate 22a receives as its inputs the output of the temperature difference detecting circuits $K_a$, $K_b$, $K_c$, $K_d$, $K_e$ and $K_f$ and the output of the temperature gradient detecting circuit J, whereby in the normal condition, i.e., when the cylinders are firing normally, all the inputs are at the "1" level and hence the output of the NAND gate 22a is at the "0" level, so that the transistor $T_{r4}$ is in the off state and thus the actuator 500 is not brought into action. However, when one of the cylinders, e.g., the third cylinder fails to fire so that the temperature starts to drop, this temperature is detected by the temperature detector 203 and thus the temperature difference detecting circuit $K_d$ comes into operation changing its output to the "0" level. As a result, the output of the NAND gate 22a changes to the "1"level and the thus the transistor $T_{r4}$ is turned on to thereby bring the actuator 500 into operation. On the other hand, should the fourth cylinder fail to fire, the temperature difference detecting circuit $K_f$ and the temperature gradient detecting circuit J come into operation. In other words, excepting the case where all the cylinders simultaneously fail to fire, when unburned gases are produced in any one of the cylinders, this can be detected by the corresponding one of the temperature difference detecting circuits $K_a$, $K_b$, $K_c$, $K_d$, $K_e$ and $K_f$ (in the present embodiment the temperature gradient detecting circuit J also comes into operation when the fourth cylinder fails to fire), whereas simultaneous failure of all the cylinders to fire can be detected by the temperature gradient detecting circuit J.

While, in the second embodiment, the control is carried out without employing such signals as the vehicle speed signal, power supply switch signal and engine revolution signal, it is of course possible to use these signals as the inputs to the decision circuit 1. Further, while the second embodiment has been described as applied to a four-cylinder engine, this embodiment could of course be used for engines other than four-cylinder engines. Furthermore, while, in this embodiment, a bypass circuit is used to prevent the occurrence of overheat, such controls as refiring and burning the unburned gases in the exhaust pipe, interrupting the supply of secondary air and cutting off the fuel supply may also be employed to prevent the occurrence of overheat. Moreover, with these methods, the thermal breakdown or deterioration or a reduced purifying performance of other type of purifier, e.g., a manifold reactor can also be prevented.

EMBODIMENT 3

The third embodiment of the present invention will now be explained with reference to FIGS. 9 through 12. This embodiment differs from the first embodiment of FIG. 1 in that the overheat detector 700 (referred to as a control circuit in this embodiment) also receives engine rpm signals from an ignition coil 1000 and therefore it is different in construction from that of the first embodiment. Accordingly, only the difference between the two embodiments will be described hereunder.

Figure 11:
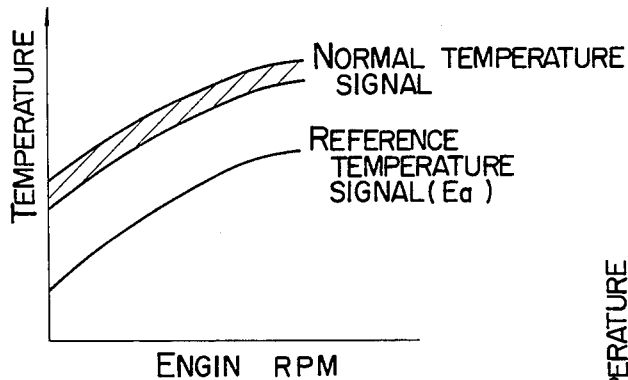
FIG. 11 is a characteristic diagram showing the relationship between the number of revolutions of an engine and the temperature in the locaity of the exhaust ports.

In this embodiment, noting the phenomenon that the temperature in the locality of the exhaust ports rapidly drops, upon occurrence of a misfire, to a low temperature as compared with the temperature in the normal condition and the first that the temperature in the locality of the exhaust ports shows a curve of a definite shape with variations in the engine rpm as shown in FIG. 11, on the basis of the engine rpm signal, a reference temperature signal is produced which corresponds to the number of engine revolutions proportional to the temperature indicative of a misfiring and this reference temperature signal is compared with a temperature signal corresponding to the temperature in the locality of the exhaust ports in the locality of the exhaust ports in the respective cylinders, whereby when the reference temperature signal is greater than the temperature signal, the occurrence of a misfire is detected and an actuator for ensuring safety of a purifier is brought into operation before the unburned gases cause overheating of the purifier.

Figure 9:
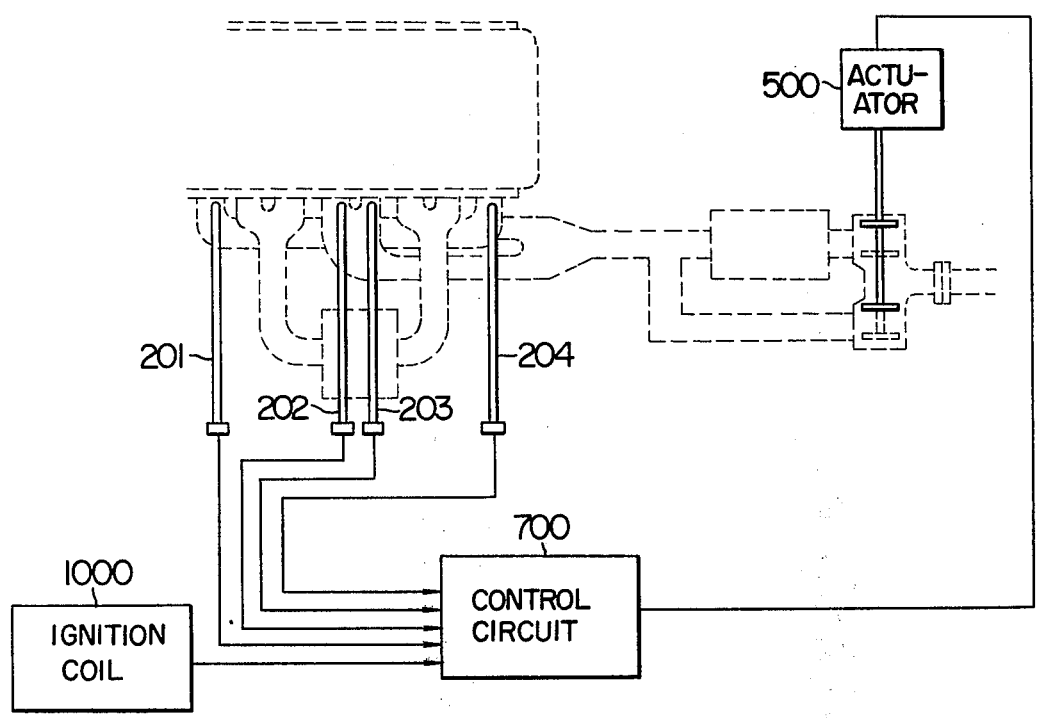
FIG. 9 is a system diagram of a third embodiment of the overheat preventing system according to the present invention, the diagram being shown in a simplified form to show only the difference between the first and third embodiments.

In FIG. 9 illustrating the third embodiment, those parts which are shown with dotted lines are identical with the corresponding parts in the first embodiment of FIG. 1. The output signal of the temperature detectors 201, 202, 203 and 204 of the thermocouple type, for example, which detect the temperature in the locality of the exhaust ports in the respective cylinders and the engine rpm signal from the primary side of the ignition coil 1000 which detects the number of engine revolutions, are applied to the control circuit 700 and the actuator 500 of the solenoid type, for example, is brought into operation by the output of the control circuit 700 to control the bypass valve 600.

Figure 10:
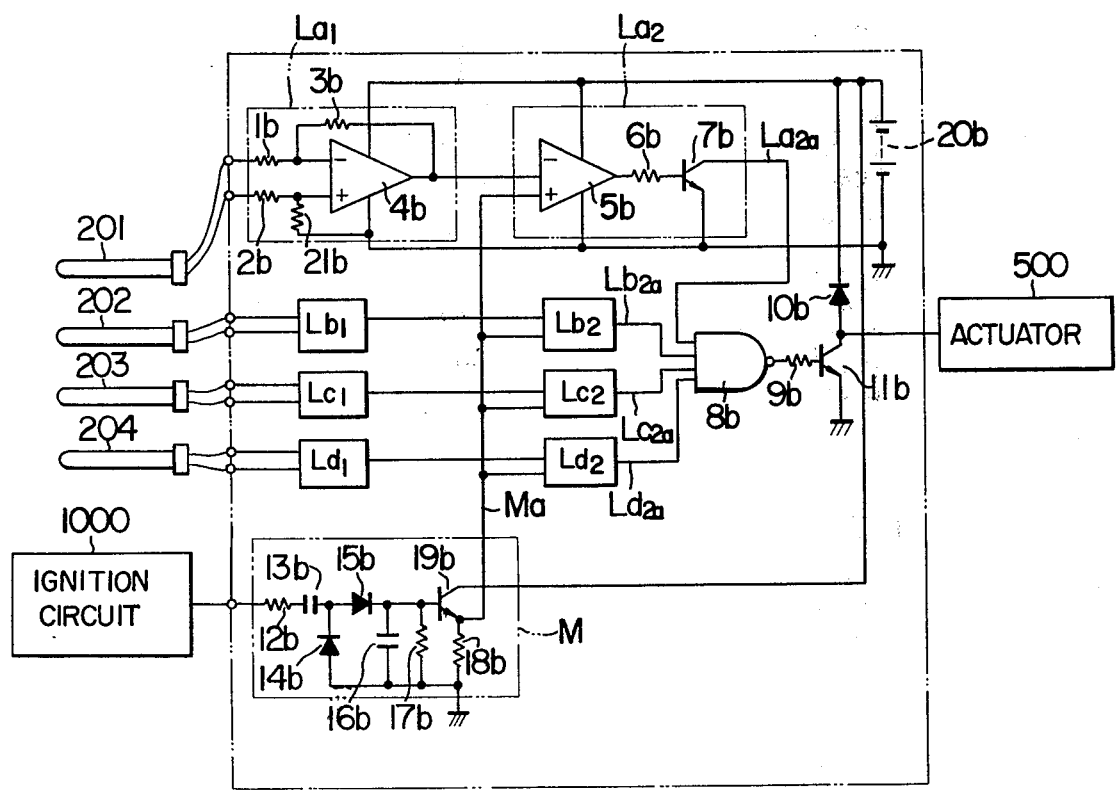
FIG. 10 is an electrical wiring diagram of the control circuit employed in the third embodiment of the invention.

Referring now to FIG. 10 illustrating the circuit construction of the control circuit 700, symbol $L_{a1}$ designates an amplifier for amplifying the signal from the temperature detector 201, $L_{b1}$ an amplifier identical with $L_{a1}$ for amplifying the signal from the temperature detector 202, $L_{c1}$ an amplifier identical with $L_{a1}$ for amplifying the signal from the temperature detector 203, $L_{d1}$ an amplifier identical with $L_{a1}$ for amplifying the signal from the temperature detector 204. Symbol $L_{a2}$ designates a voltage comparator for comparing the signal from the amplifier $L_{a1}$ and the signal from a reference signal generator M, $L_{b2}$ a voltage comparator identical with $L_{a2}$ for comparing the signal from the amplifier $L_{b1}$ and the signal from the reference signal generator M, $L_{c2}$ a voltage comparator identical with $L_{a2}$ for comparing the signal from the amplifier $L_{c1}$ and the signal from the reference signal generator M, $L_{d2}$ a voltage comparator identical with $L_{a2}$ for comparing the signal from the amplifier $L_{d1}$ and the signal from the reference signal generator M. In the normal condition, the reference signal from the reference signal generator M is smaller than the temperature signal from the amplifiers $L_{a1}$, $L_{b1}$, $L_{c1}$ and $L_{d2}$ included in the voltage comparators $L_{a2}$, $L_{b2}$, $L_{d2}$, respectively, so that the respective output lines $L_{a2a}$, $L_{b2a}$, $L_{c2a}$ and $L_{d2a}$ are at the "1" level. Whereas when a misfier occurs, the reference signal becomes higher than the temperature signal so that the output lines $L_{a2a}$, $L_{b2a}$, $L_{c2a}$ and $L_{d2a}$ assume the "0" level.

Next, the construction of the amplifier $L_{a1}$ will be explained, in which numeral 1b designates an inverting input resistor of a differential amplifier 4b which is connected to the negative side of the output of the temperature detector 201 of the thermocouple type. Numerals 2b and 21b designate noninverting input resistors of the differential amplifier 4b with the resistor 2b being connected to the positive side of the temperature detector 201. If the values of the resistors 1b, 2b, 3b and 21b are represented as $R_1$, $R_2$, $R_3$ and $R_4$, then the output electromotive force of the temperature detector 201 is amplified with a gain $R_3/R_1$ by the amplifier $L_{a1}$ and the output potential rise with the temperature.

In the illustrated circuit construction of the voltage comparator $L_{a2}$, numeral 5b designates a comparator having its inverting input connected to the output of the amplifier $L_{a1}$ and its noninverting input connected to the output of the reference signal generator M. Numeral 6b designates the base resistor of a transistor 7b. In the driving circuit for the actuator 500 which follows the above-constructed voltage comparator $L_{a2}$, numeral 8b designates a NAND gate, 9b the base resistor of a transistor 116, 10b a counter electromotive force absorbing diode, 20b a battery.

Next, the construction of the reference signal generator M is as follows: The principal part comprises resistors 12b and 17b, capacitors 13b and 16b and diodes 14b and 15b, whereby when the pulse signal from the primary side of the ignition coil 1000 is applied to the input side of the resistor 12b, the applied pulse signal is differentiated by the differentiating capacitor 13b and the negative portion of the differentiated pulse is blocked by the diode 14b. The positive differentiated pulse is then integrated through the diode 15b to generate across the resistor 17b a positive DC voltage proportional to the engine revolutions. The DC voltage is then subjected to impedance transformation through an emitter-follower circuit comprising a transistor 19b and an emitter resistor 18b and the resultant output signal $M_a$ constitutes the reference temperature signal. In this case, a normal operation temperature signal characteristic curve and reference temperature signal curve as shown in FIG. 11 can be obtained by properly setting the amplification factor of the amplifiers $L_{a1}$, $L_{b1}$, $L_{c1}$ and $L_{d1}$ and the values of the capacitor 16b and the resistor. In the normal condition, all the inputs to a NAND gate 8b are at the "1" level so that a transistor 11b is turned off and the actuator 500 is not brought into action. On the other hand, when any one of the cylinders fails to fire, the output of the voltage comparators $L_{a2}$, $L_{b2}$, $L_{c2}$ or $L_{d2}$ corresponding to the cylinder which failed to fire assumes the "0" level and the output of the NAND gate 8b changes to the "1" level. Consequently, the base current is supplied to the transistor 11b so that the transistor 11b becomes conductive and the actuator 500 is energized to come into operation.

Figure 12:
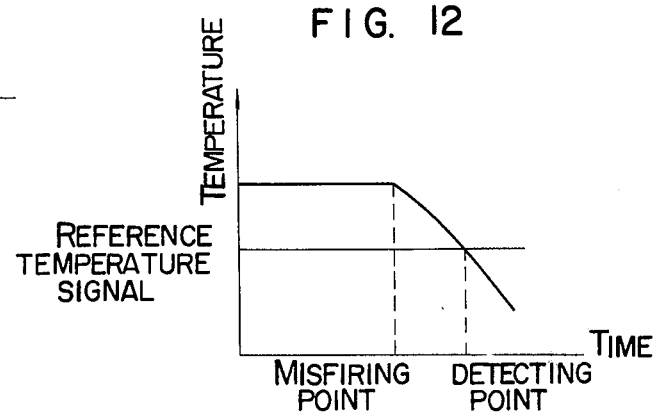
FIG. 12 is a characteristic diagram showing the relationship between the temperature in the locality of the exhaust ports upon the occurrence of a misfire and the time.

FIG. 11 illustrates the relationship between the temperature (ordinate) in the locality of the exhaust and the engine revolutions (abscissa), showing the values of the cylinder normal temperature signal (hatched portion) and the values of the reference temperature signal. The hatched portion indicates the range of variations caused by different cylinders, loads or the like. Further, FIG. 12 illustrates the changes with time of the temperature in the locality of the exhaust ports upon the occurrence of a misfire with the abscissa representing the time and the ordinate representing the temperature. For example, when the reference temperature signal is set to a temperature range lower by 100° C. than that of the normal temperature signal, failure of the engine 100 to fire can be detected at the expiration of about 1 second after the occurrence of a misfire.

With the arrangement described above, the temperature in the locality of the exhaust ports of the respective cylinders is detected by the temperature detectors 201, 202, 203 and 204, respectively, and the detected temperature signals are amplified by the amplifiers $L_{a1}$, $L_{b1}$, $L_{c1}$ and $L_{d1}$. In the normal condition of the engine, the relationship between the engine revolutions and the temperature in the locality of the exhaust ports shows the sloped line region shown in FIG. 11. The reference temperature signal obtained from the engine rpm signal also shows the characteristic shown in FIG. 11. In this case, the output of the comparator 5b (shown for the voltage comparator $L_{a2}$ and no other) is at the "0" level and consequently the transistor 7b (shown for the voltage comparator $L_{a2}$ and no other) is turned off, and thus all the outputs of the voltage comparators $L_{a2}$, $L_{b2}$, $L_{c2}$ and $L_{d2}$ are at the "1" level. As a result, the output of the NAND gate 8b is at the "0" level and the transistor 11b is turned off. This deenergizes the actuator 500 and the actuator 500 does not come into operation. On other hand, when at least one cylinder fails to fire, the signal from the corresponding one of the amplifiers $L_{a1}$, $L_{b1}$, $L_{c1}$ and $L_{d1}$ becomes lower than the reference temperature signal since the temperature starts to drop rapidly as shown in FIG. 12 and thus the output of the voltage comparator corresponding to the cylinding failing to fire changes to the "0" level. Consequently, the transistor 11b is turned on and thus the energized actuator 500 comes into operation to bypass the exhaust gases around the catalytic converter 400.

EMBODIMENT 4

The fourth embodiment of the present invention will now be explained with reference to FIGS. 13 through 16. This embodiment differs from the first embodiment of FIG. 1 in that the signal from the high-tension cord of a distributor 2000 is also applied to the overheat detector 700 (referred to as a control circuit in this embodiment) and therefore the overheat detector 700 is different in construction from that in the first embodiment. Accordingly, only the difference between the two embodiments will be explained.

In the fourth embodiment, noting the phenomenon that the temperature in the locality of the engine exhaust ports rapidly drops from the steady state value to a low value owing to unburned gases as a prediction of overheating condition, as for example, an actuator for an exhaust gas bypassing circuit which is adapted to operate in such a manner as to prevent the overheating of a purifier is operated and at the same time the pulse signal from the high-tension cord of a distributor is differentiated through a high-pass filter and the differentiated pulse is then integrated, whereby when the integrated voltage level drops below a predetermined value, it is assumed that a fault has occurred in the ignition system and thus an actuator for ensuring safety of the exhaust gas purifier is brought into operation.

Figure 13:
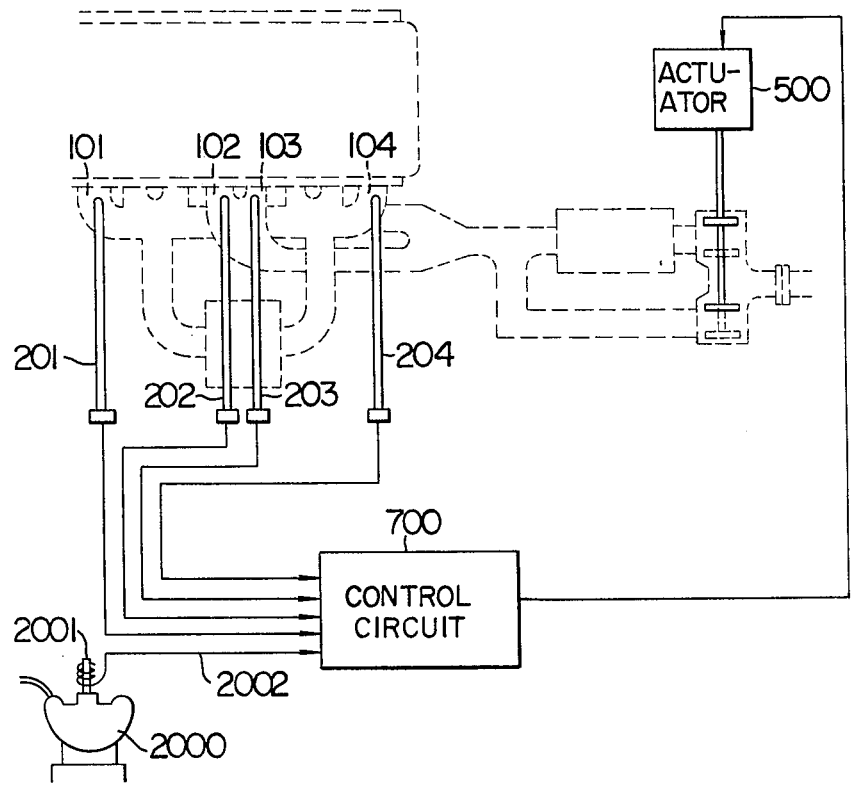
FIG. 13 is a system diagram showing a fourth embodiment of the overheat preventing system according to the present invention, the diagram being shown in a simplified form to show only the difference between the first and fourth embodiments.

In FIG. 13 illustrating the fourth embodiments, those component parts indicated with the dotted lines are identical with the corresponding parts in the first embodiment of FIG. 1. The signal lines of the temperature detectors 201, 202, 203 and 204 of the thermocouple type, for example, which are designed to detect the temperature in the locality of the cylinder exhaust ports and a signal line 2002 wound on a high-tension cord 2001 of the distributor 2000, are connected to the control circuit 700 whose output signal energizes the solenoid type actuator to control the bypass valve.

Figure 14:
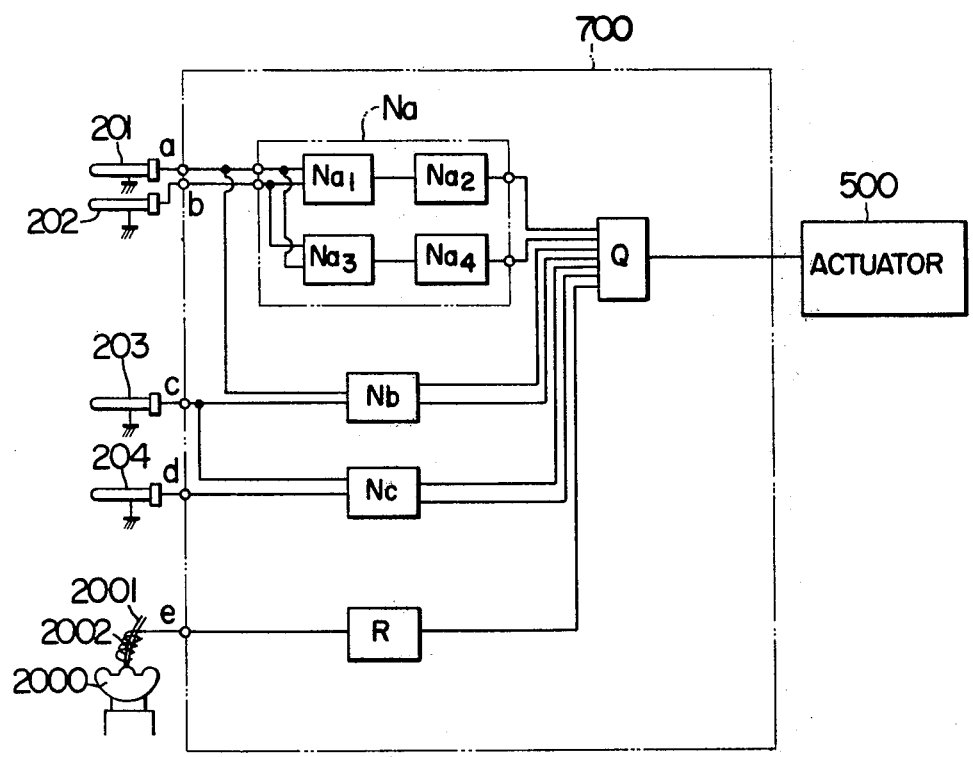
FIG. 14 is a block diagram of the control circuit employed in the fourth embodiment of the invention.

In FIG. 14 illustrating a block diagram of the control circuit 700, symbols $N_a$, $N_b$ and $N_c$ designate temperature difference detectors, and the temperature detectors 201, 202, 203 and 204 have their negative sides grounded and the positive sides connected respectively to terminals a, b, c and d. Symbol R designates an ignition system checking circuit, $N_{a1}$ and $N_{a3}$ differential amplifier means, $N_{a2}$ and $N_{a4}$ voltage comparators, Q a decision circuit. The temperature difference detectors $N_a$, $N_b$ and $N_c$ are of the identical circuit construction.

Figure 15:
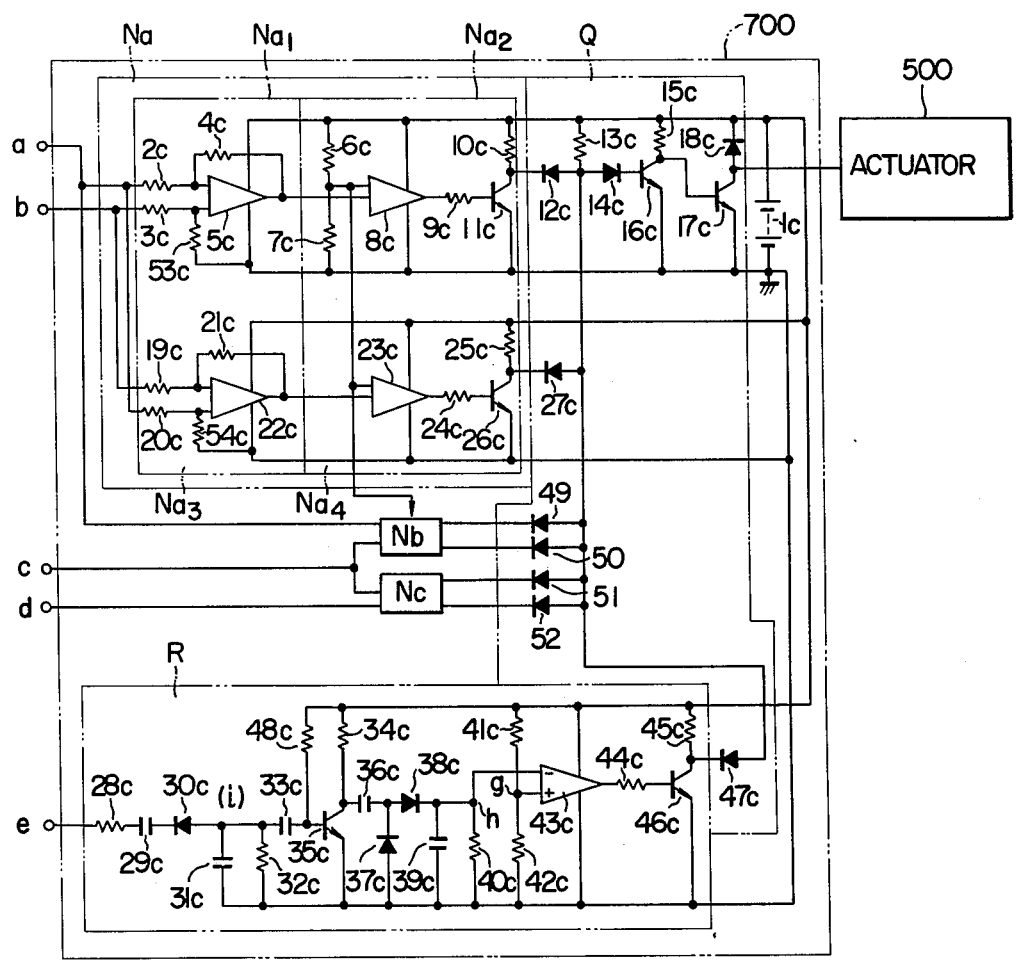
FIG. 15 is a detailed electrical wiring diagram of the control circuit of FIG. 14.

In FIG. 15 illustrating a detailed electrical wiring diagram of the control circuit 700, numeral 5c designates a differential amplifier, 2c the inverting input resistor of the differential amplifier 5c which is connected to the terminal a, 3c and 53c the noninverting input resistors of the differential amplifier 5c with the resistor 3c connected to the terminal b and the resistor 53c grounded. Numeral 4c designates the feedback resistor of the differential amplifier 5c. These elements constitute the differential amplifier means $N_{a1}$ which amplifies the difference between the electromotive force signals applied to the terminals a and b and corresponding to the temperature in the locality of exhaust ports 101 and 102. When the potential at the terminal b is higher than the potential at the terminal a, the output level is increased. Numerals 6c and 7c designate dividing resistors for providing a reference voltage level, 8c a comparator having its noninverting input connected to the output of the differential amplifier 5c and its inverting input connected to the dividing point of the dividing resistors 6c and 7c. Numeral 11c designates a transistor, 9c the base resistor of the transistor 11c, 10c the collector resistor of the transistor 11c. These elements constitute the voltage comparator $N_{a2}$. Since the output of the differential amplifier 5c is normally lower than the potential at the dividing point f (the inverting input) and thus the output of the comparator 8c is at the "0" level, the transistor 11c is turned off and its collector output is at the "1" level. When the output of the differential amplifier 5c becomes higher than the inverting input, the output of the comparator 8c changes to the "1" level and therefore the collector output of the transistor 11c changes to the "0" level. The differential amplifier means $N_{a3}$ comprises an inverting input resistor 19c, noninverting input resistors 20c and 54c, a feedback resistor 21c and a differential amplifier 22c and these elements have the same values as those of the differential amplifier means $N_{a1}$, but it differs from the latter in that the terminal a is connected to the noninverting input resistor 20c and the terminal b is connected to the inverting input resistor 19c. The output level of the differential amplifier 22c becomes high when the potential at the terminal a is higher than the potential at the terminal b. The voltage comparator $N_{a4}$ comprises a comparator 23c, a transistor 26c, a base resistor 24c and a collector resistor 25c and it is substantially identical with the voltage comparator $N_{a2}$. The inverting input to the voltage comparator $N_{a4}$ is supplied from the dividing point f of the dividing resistors 6c and 7c. Since the output level of the differential amplifier 22c is normally lower than the level at the dividing point f and thus the output of the comparator 23c is at the "0" level, the collector output of the transistor 26c is at the "1" level. When the output level of the differential amplifier 22c becomes higher than the level at the dividing point f, the output of the comparator 23c changes to the "1" level and therefore the collector output of the transistor 26c changes to the "0" level.

The temperature difference detectors $N_b$ and $N_c$ are identical in circuit construction with the above-described temperature difference detector $N_a$. The temperature difference detector $N_b$ compares the electromotive force signals introduced from the terminals a and c, while the temperature difference detector $N_c$ compares the electromotive force signals introduced from the terminals c and d. The inverting inputs of the voltage comparators in the temperature difference detectors $N_b$ and $N_c$ are connected to the dividing point f. In the normal condition, the output of the temperature difference detectors $N_b$ and $N_c$, respectively, is at the "1" level.

Next, the ignition system checking circuit R will be explained. In this circuit, numeral 28c designates a resistor, 29c a differentiating capacitor (serving as a high-pass filter), 30c a diode for passing only the negative portions of the input, 31c an integrating capacitor, 33c a coupling capacitor, 48c a biasing resistor, 35c a transistor, 34c a collector resistor, 36c a differentiating capacitor, 37c a diode for blocking the negative portions of the differentiated pulse, 38c a diode for passing the positive portions of the differentiated pulse, 39c an integrating capacitor, 40c a resistor, 41c and 42c dividing resistors for providing a reference level. Numeral 43c designates a comparator whose noninverting input is derived from a junction point g of the dividing resistors 41c and 42c and the inverting input is derived from a positive terminal h of the resistor 40c. In the normal condition, when the potential at the point h is higher than the potential at the point g, the output of the comparator 43c is at the "0" level, whereas when the potential at the point g is higher than the potential at the point h, the output of the comparator 43c is at the "1" level. Numeral 44c designates the base resistor of a transistor 46c, 45c the collector resistor of the transistor 46c. When the output of the comparator 43c is at the "0" level, the collector output of the transistor 46c is at the "1" level, whereas when the output of the comparator 43c is at the "1" level, the collector output of the transistor 46c is at the "0" level.

Next, the decision circuit Q will be explained. In this circuit, diodes 12c, 27c, 49c, 50c, 51c, 52c and 47c, a resistor 13c, a diode 14c, a transistor 16c and a collector resistor 15c of the transistor 16c constitute a NAND circuit. In the normal condition, all the inputs of the NAND circuit Q are at the "1" level and thus the transistor 16c is turned on with the output at the "0" level. Consequently, the transistor 17c is turned off and therefore the actuator 500 is not energized. Numeral 18c designates a counter electromotive force absorbing diode, 1c a battery. When the input change to the "0" level, the transistor 16c is turned off and the transistor 17c is turned on thereby energizing the actuator 500.

With the construction described above, the fourth embodiment operates as follows: The difference temperature signal of a first exhaust port temperature signal (a) and a second exhaust port temperature signal (b) is amplified by the differential amplifiers 5c and 22c of the differential amplifier means $N_{a1}$ and $N_{a3}$, so that the amplified signal is always compared with the preset potential at the dividing point f (the preset temperature reference level indicating the occurrence of unburned gases that would cause overheating). In the normal condition, the difference between the temperature signals (a) and (b) is within the predetermined range of variations and therefore the amplified signals from the differential amplifier means $N_{a1}$ and $Na_3$ are small and are thus lower than the preset potential at the dividing point f, so that the output of the comparator 8c is at the "0" level and hence the collector output of the transistor 11c is at the "1" level. Similarly, in the normal condition, the difference between the temperature in the locality of the exhaust ports of the first and third cylinders as well as the third and fourth cylinders is within the predetermined range of variations and therefore the output of the temperature difference detectors $N_b$ and $N_c$ are at the "1" level. In the normal condition, the output of the ignition system checking circuit R is also at the "1" level and therefore all the inputs of the NAND circuit or the decision circuit Q are at the "1" level so that the transistor 16c is turned on and the transistor 17c is turned off. Consequently, the actuator 500 is not energized and a bypass valve is connected with a catalytic converter to pass and purify the exhaust gases through the catalytic converter. Assuming now that the first cylinder fails to fire so that the temperature in the locality of the first cylinder exhaust port starts to drop and thus the potential at the terminal a becomes low as compared with the potential at the terminal b, the difference voltage between the potentials at the terminals a and b is amplified by the differential amplifier means $N_{a1}$, whereby when its output potential gets higher than the present potential (the potential at the dividing point f), the output of the comparator 8c changes to the "1" level and thus the transistor 11c is turned on changing its collector output to the "0" level.

Consequently, the input to the NAND circuit or the decision circuit Q changes to the "0" level and thus the transistor 16c is turned off and the transistor 17c is turned on. This energizes the actuator 500 so that the bypass valve provides a bypass to permit the exhaust gases to go around the catalytic converter and directly into a muffler and thereby prevent overheating of the catalytic converter. Further, when the second cylinder fails to fire, the output of the voltage comparator $N_{a4}$ changes to the "0" level energizing the actuator 500. When any other cylinder fails to fire, the output of either one of the temperature difference detectors $N_b$ and $N_c$ changes to the "0" level. Further, when the second and third cylinders simultaneously fail to fire, the corresponding outputs of the temperature difference detectors $N_a$, $N_b$ and $N_c$ change to the "0" level energizing the actuator 500.

Figure 16:
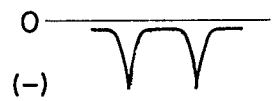
FIG. 16 shows the output waveform at a point i in the circuit of FIG. 15.

On the other hand, the pulse from the ignition secondary coil is passed through the resistor 28c and differentiated by the capacitor 29c. Here, the value of the capacitor 29c is selected so that it serves as a high-pass filter which passes pulses only when it discharges (the pulse fall at a very high frequency). Consequently, the differentiated pulse is produced only when the capacitor 29c discharges and only the negative portion of the differentiated pulse is passed through the diode 30c and integrated by the capacitor 31c (FIG. 16). The integrated pulse is coupled by the capacitor 33c and therefore the transistor 35c is turned off only on the fall of the differentiated pulse. Of course, the transistor 35c remains in the on state when there is no differentiated pulse. Consequently, the collector output of the transistor 35c provides a positive pulse only when the pulse from the ignition secondary coil is normal. The positive pulse is differentiated by the capacitor 36c and the negative portion is blocked by the diode 37c and thus only the positive portion of the pulse is integrated by the capacitor 39c through the diode 38c producing across the resistor 40c a signal substantially linearly proportional to the number of engine revolutions under normal firing conditions. This signal potential is compared with the present potential at the dividing point g in the comparator 43c so that in the normal condition with the cylinders firing properly, the potential at the point h is higher than the potential at the point g, the output of the comparator 43c is at the "0" level and the transistor 46c is turned off with the collector output being at the "1" level.

If a fault occurs in the ignition system, e.g., when the secondary coil pulse fails to appear or there is an open condition (a situation where there are pulses but no discharge occurs), there is no differentiated pulse from the capacitor 29c and hence there is no integrated pulse from the capacitor 39c. Consequently, the potential at the point g is higher than the potential at the point h, the output of the comparator 43c changes to the "1" level and the transistor 46c is turned on, changing its collector output to the "0" level and thereby changing the input to the NAND circuit or the decision circuit Q to the "0" level. As a result, the transistor 16c is turned off and the transistor 17c is turned on energizing the actuator 500. In other words, excepting where all the cylinders fail to fire, failure of one or more cylinders to fire can be detected by one or more of the temperature difference detectors $N_a$, $N_b$ and $N_c$, while any fault in the ignition system which causes simultaneous failure of all the cylinders to fire can always be checked by the ignition system checking circuit R. After all, in any circumstances, the occurrence of a misfire which predicts overheating of the purifier can be detected.

EMBODIMENT 5

FIGS. 17 through 22 illustrate the fifth embodiment of the present invention. As will be seen from FIG. 17, the fifth embodiment differs from the first embodiment of FIG. 1 in that there is further provided an actuator 501 which controls the throttle valve of a carburetor 900 and the throttle valve is closed by the signal from the overheat detector 700. Accordingly, the difference between the two embodiments will be mainly described hereunder. In this embodiment, noting the phenomenon that the temperature within the purifier drops if the carburetor throttle valve is closed upon occurrence of a misfire, as well as the phenomenon that occurrence of misfiring causes the temperature in the locality of the exhaust ports to rapidly drop to a low temperature, the actuator 500 for the exhaust system is brought into operation in response to a signal from the overheat detector 700 which indicates failure of the engine to fire and on the other hand the actuator 501 for the air inlet system is also brought into operation.

Figure 18:
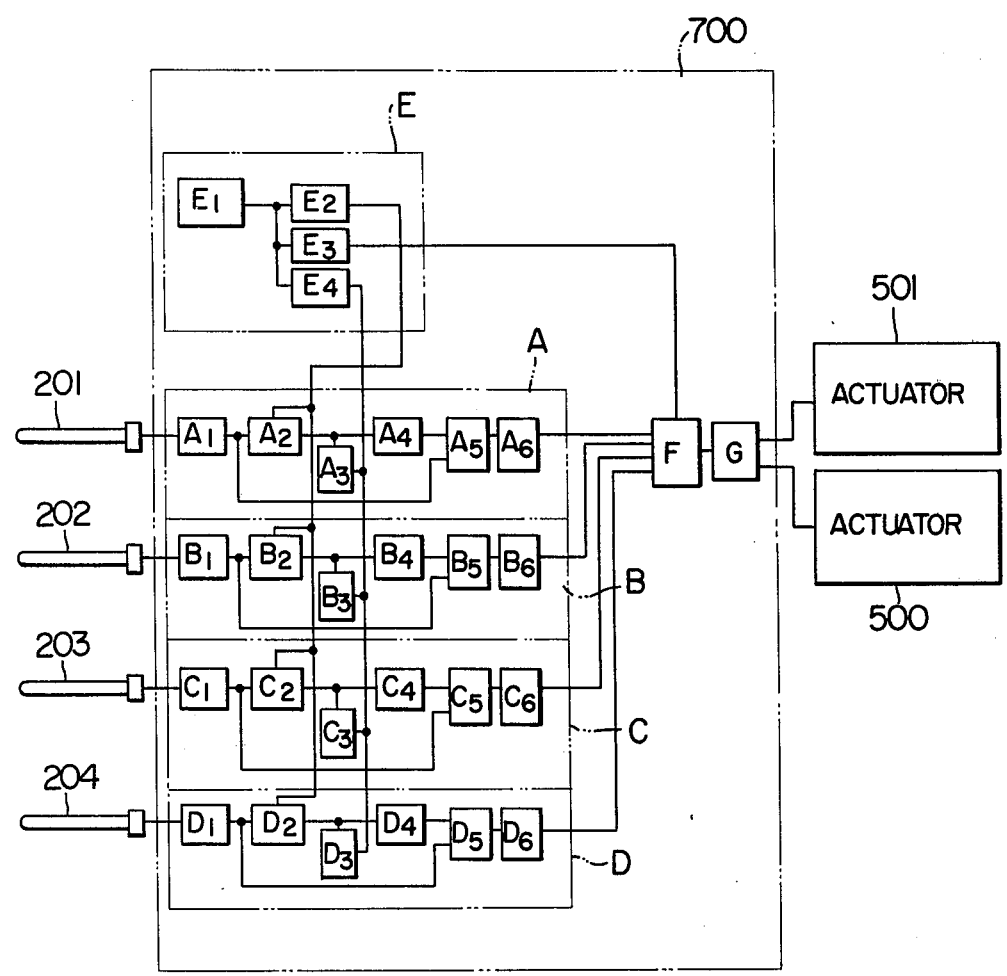
FIG. 18 is a block diagram of the overheat detector employed in the fifth embodiment of FIG. 17.

FIG. 18 illustrates a block diagram of electronic circuitry of the overheat detector 700 employed in the fifth embodiment. This overheat detector 700 is identical in construction with the overheat detector 700 of the first embodiment shown in FIG. 2, excepting that its output, i.e., the signal from the power circuit G is supplied, as previously mentioned, to both the air inlet system actuator 501 and the exhaust system actuator 500.

Figure 20:
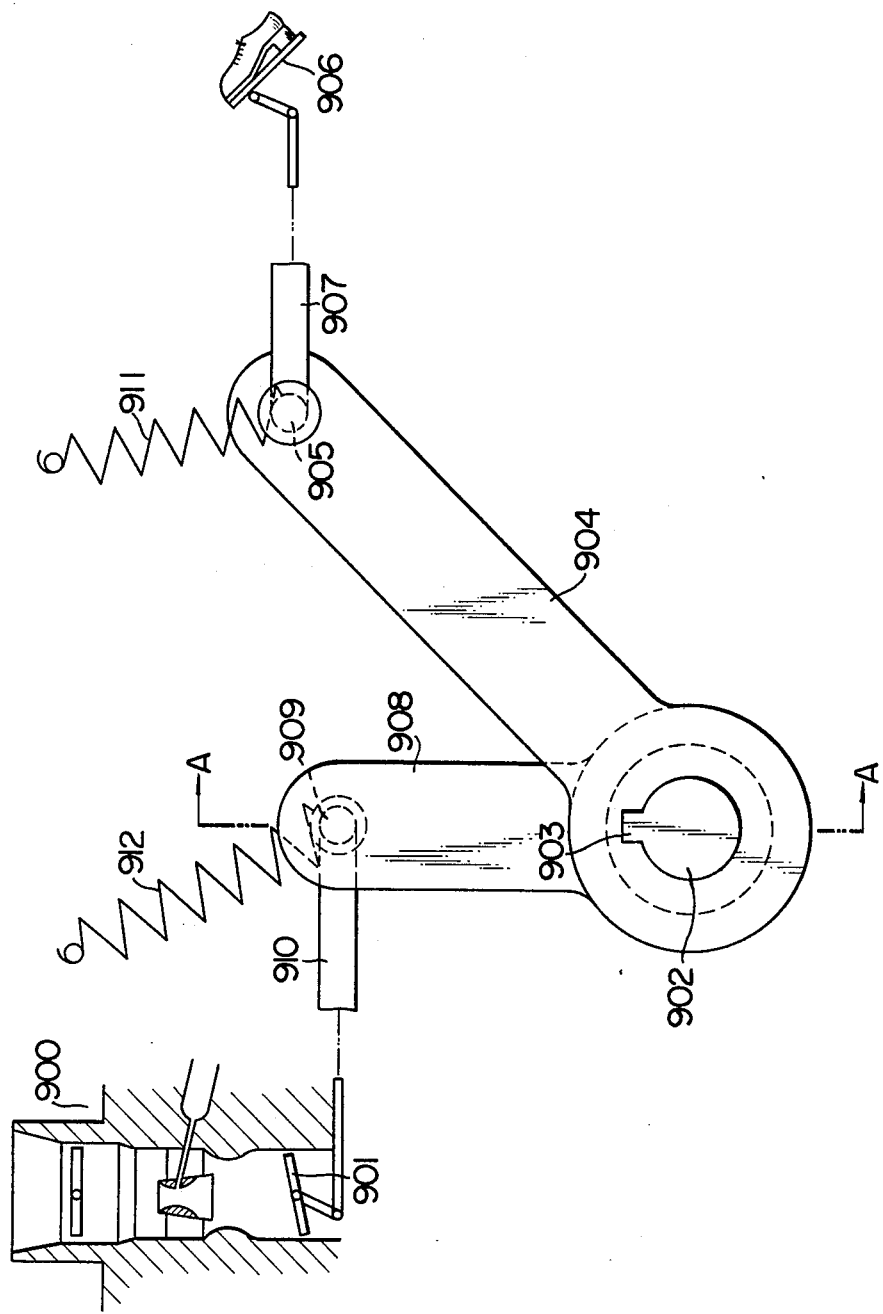
FIG. 20 is a front view showing the lever mechanism of the carburetor shown in the system diagram of FIG. 1.
Figure 21:
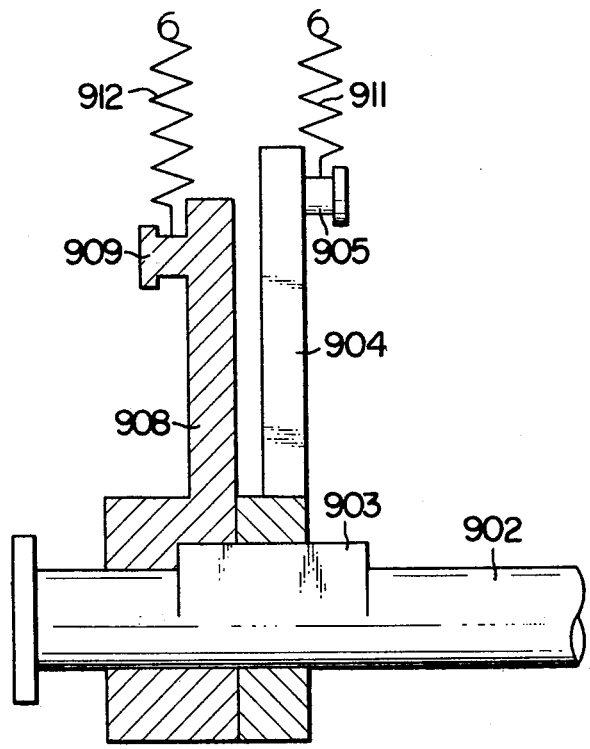
FIGS. 21 and 22 are sectional views taken along the line A—A of the lever mechanism shown in FIG. 20, with FIG. 21 showing the conditions in the normal condition and FIG. 22 showing the conditions upon the occurrence of a misfire.
Figure 22:
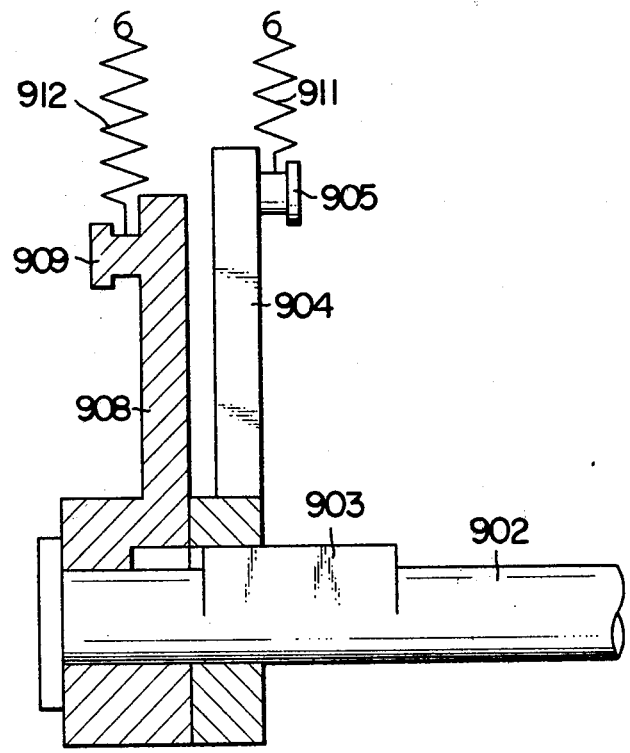

As shown in FIGS. 20 through 22, the carburetor 900 includes a lever mechanism linked to a throttle valve 901. In the lever mechanism, numeral 902 designates a shaft which is moved in the axial direction by the throttle valve actuator 501 comprises a magnetic coil and it is also provided with a key 903. Numeral 904 designates an accelerator lever having one end thereof axially slidably mounted on the shaft 902 and the other end provided with a pin 905 which is connected to a rod 907 connected to an accelerator pedal 906. Numeral 908 designates a throttle valve lever whose one end is axially slidably mounted on the shaft 902 and the other end is provided with a pin 909 to which is connected a rod 910 connected to the throttle valve 901. Numerals 911 and 912 designate springs attached rspectively to the pins 905 and 909 to exert a spring force thereon so that the levers 904 and 908 are rotated in the direction to close the throttle valve 901.

FIG. 21 shows the conditions in the lever mechanism of the carburetor 900 in the normal condition, and the accelerator lever 904 is rotatable together with the throttle valve lever 908 through the shaft 902 and the bypass valve 600 provides a path to the catalytic converter as indicated by numeral 600b so that the exhaust gases from the engine 100 to which the normally required fuel and air are being supplied, are exhausted to the muffler 800 through the catalytic converter 400. On the other hand, should an overheat occur, the throttle valve actuator 501 comes into operation moving the shaft 902 from its position shown in FIG. 21 to the right in the axial direction. Consequently, the throttle valve lever 908 is released from the restraint of the key 903 on the shaft 902 and it is thus rotated by the force of the spring 912 in such a manner as to move the throttle valve 901 to the fully-closed position.

Figure 19:
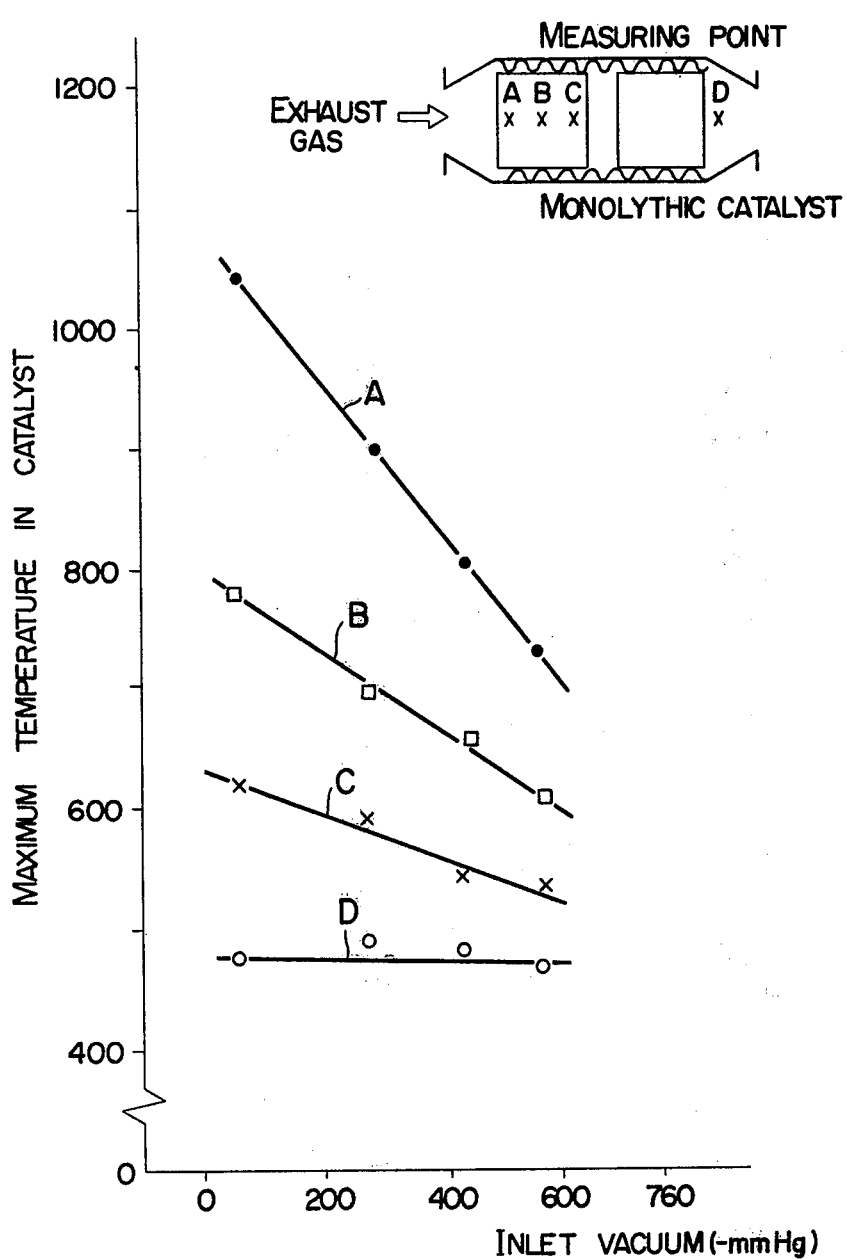
FIG. 19 is a diagram showing the relationship between the inlet manifold vacuum and the maximum temperature at various points in the catalyst when all of the engine cylinders failed to fire.

The operation of the fifth embodiment will now be explained. To begin with, the discovery of the phenomenon that the closing of a carburetor throttle valve upon occurrence of a misfire results in a reduced temperature in a purifier, which the invention has observed through experiments, will be explained. Referring to FIG. 19, the ordinate represents the maximum temperature in the catalyst and the abscissa represents the inlet vacuum in the inlet system which corresponds to the position of the carburetor throttle valve (when the number of engine revolutions is constant). As indicated by the straight line A, the temperature at a temperature measuring point A in the purifier tends to decrease as the inlet vacuum increases, i.e., as the opening of the throttle valve decreases. As regards other temperature measuring points B, C and D, in substantially similar manner the temperature tends to decrease as the inlet vacuum increases. From the foregoing fact, the inventor has concluded that it is possible to decrease the temperature within the purifier by closing the carburetor throttle valve upon occurrence of a misfire. The experimental data shown in FIG. 19 were obtained from the tests conducted by operating a four-cylinder 1900 cc engine at a constant vehicle speed of 60 miles/hour and causing its whole cylinders to simultaneously misfire and employing a purifier provided with a monolythic catalyst. The occurrence of the phenomenon that the temperature in the locality of the exhaust ports rapidly drops to a low temperature upon occurrence of a misfire is the fact which has also been confirmed by the inventor from the results of the experiments conducted.

Figure 17:
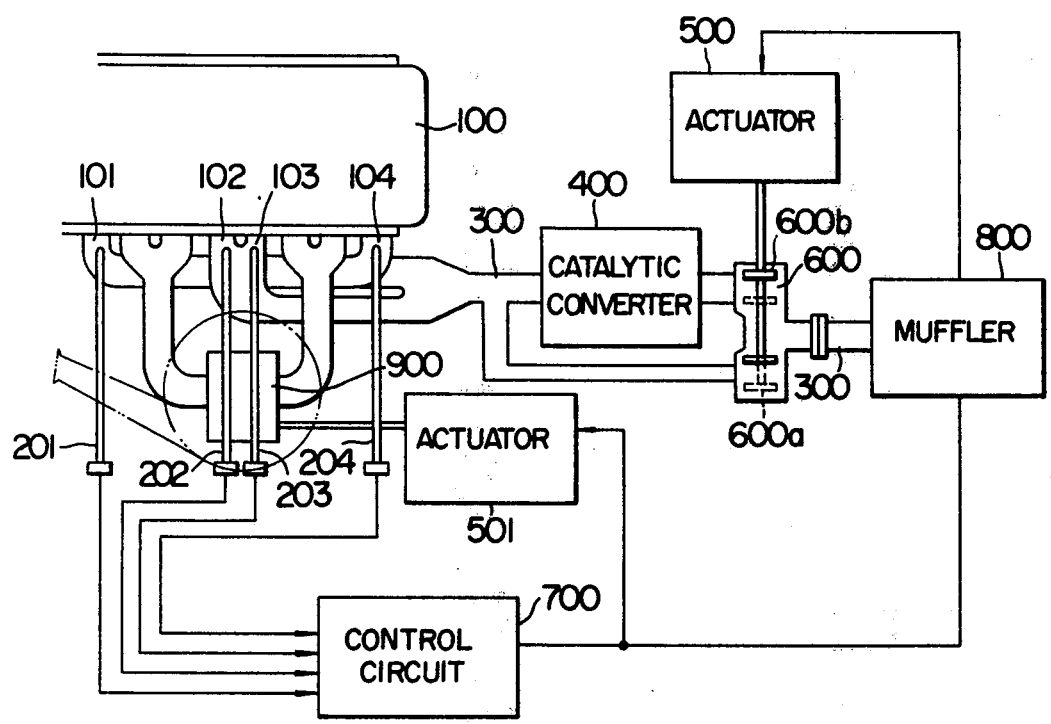
FIG. 17 is a system diagram of a fifth embodiment of the overheat preventing system according to the present invention.

Referring now to FIG. 17, similarly as in the previously described embodiments, the temperature detectors 201, 202, 203 and 204 of the thermocouple type, for example, which detect the temperature of the exhaust gases in the locality of engine exhaust ports 101, 102, 103 and 104, are connected to the overheat detector 700. However, the signal from the overheat detector 700 is supplied to the actuator 500 for the bypass valve as well as to the actuator 501 for the throttle valve of the carburetor 900. As shown in FIG. 18, the temperature detectors 201, 202, 203 and 204 are connected respectively to the temperature gradient detecting circuits A, B, C and D adapted for detecting the signals from the respective temperature detectors, and the temperature gradient detecting circuits are in turn connected to the logical circuit F which discriminates the signals from the temperature gradient detecting circuits every time the temperature change rate detecting signal arrives from the temperature change rate detecting signal circuit $E_3$ so as to detect the occurrence of an overheat. The power circuit G which detects the occurrence of an overheat from the output signal of the logical circuit F to operate the throttle valve actuator 501 and the bypass valve actuator 500 is connected to the logical circuit F. When the output of the logical circuit F does not indicate the occurrence of overheat, the power circuit G supplies no signal to the throttle valve actuator 501 and the bypass valve actuator 500. As a result, in the lever mechanism of the carburetor 900, the shaft 902 is not in the rigthward position, i.e., it is in the position shown in FIG. 21 and therefore the two levers 904 and 908 are rotatable together through the key 903 of the shaft 902. As a result, the throttle valve 901 of the carburator 900 is directely operated by the accelerator pedal 906 through the rod 910, lever 908, shaft 902, lever 904 and rod 907. On the other hand, the bypass valve 600 in the exhaust system is moved to the position designated by numeral 600b thereby bypassing no exhaust gases.

Conversely, when the output of the logical circuit F indicates the occurrence of overheat, the signal from the power circuit G causes the throttle valve actuator 501 and the bypass valve actuator 500 to come into operation. As a result of the operation of the actuator 501, in the lever mechanism of the carburator 900, the shaft 902 is moved to the right in the axial direction as shown in FIG. 22 and thus the throttle valve lever 908 is released from the restraint of the key 903 and rotated to the position shown in FIG. 20 by the force of the spring 912, thereby moving the throttle valve 901 to the fully-closed position.

On the other hand, in the exhaust system, the bypass valve 600 is moved to the position designated by numeral 600a to bypass the exhaust gases. In this case, owing to the fact that the valve body itself of the bypass valve 600 has a large mass and that the flow of a large mass of exhaust gases must be changed from one path to another, the time required for the bypass valve 600 to start and complete its operation entirely is about one second. However, since the throttle valve 901 of the carburetor 900 is rotated very quickly by the force of the spring 912 as soon as the shaft 902 of the lever mechanism is moved by the throttle valve actuator 501 so that throttle valve lever 908 is disengaged from the key 903 of the shaft 902, the throttle valve 901 is moved to the fully-closed position before the bypass valve 600 completely finishes its operation. Consequently, the amount of unburned gases which tends to flow into the purifier during the period of about one second can also be decreased considerably.

While, in the embodiment described above, the change rate with time of the temperature in the locality of the exhaust ports 101, 102, 103 and 104 of the engine 100 is detected to determine the occurrence of a misfire, instead of this method, a temperature signal corresponding to the temperature in the locality of the exhaust ports may be produced and compared with a reference temperature signal produced from an engine rpm signal and corresponding to the engine revolutions representing the temperature in the locality of the exhaust ports which is produced upon occurrence of a misfire, whereby the occurrence of a misfire is detected when the reference temperature signal becomes higher than the temperature signal. Alternately, it is possible to detect the temperature in the locality of the exhaust ports so that the detected temperatures of the suitably associated cylinders may be compared to thereby detect the occurrence of a misfire when the temperature difference exceeds a predetermined value, or still alternately the change rate with time of the temperature in the locality of the exhaust port of one of the cylinders may be detected in addition to the detection of the temperature difference, whereby the occurrence of a misfire may be detected when at least one of the temperature difference or the temperature change rate exceeds a predetermined value. Further, while, in the embodiment described above, the lever mechanism of the carburetor 900 shown in FIGS. 20 to 22 is employed, an accelerator lever and a throttle valve lever which are movably fit onto a stationary shaft may be interconnected with a pin having an axis in the same direction as that of the shaft, so that the pin is moved by the throttle valve actuator 501 to break the connection between the levers, or alternately the clutch mechanism installed in an automobile or the like may be utilized to break the connection between the levers. Furthermore, while, in this embodiment, the throttle valve actuator 501 comprises a magnetic coil, a pressure operated mechanism employing for example a diaphragm which is operated by a magnetic selector valve may be employed.

Moreover, while, in the above embodiment, the discharging of exhaust gases through a bypass circuit is utilized as an overheat preventive measure for the exhaust system, the interruption of secondary air is of course an effective measure for preventing the occurrence of an overheat in the exhaust system. Further, while the above embodiment is used with the catalytic converter, the system of the present invention, as an overheat preventive device for the exhaust system, e.g., a device adapted to interrupt the supply of secondary air or fuel, may be course be employed with other purifiers such as a manifold reactor and an afterburner.

We claim:

1. An overheat preventing system for exhaust gas purifier of a vehicle comprising:
    a temperature detector inserted in the locality of each of a plurality of engine exhaust ports;
    an overheat detector means for detecting failure of an engine to fire from signals from said temperature detectors to produce a signal, said overheat detector means detecting the time rate of change of the temperature in the locality of said engine exhaust ports, whereby when said temperature change rate reaches a predetermined value, the occurrence of a misfire is detected to generate an overheat signal; and
    means responsive to said signal generated from said overheat detector means to prevent unburned gases from flowing into an exhaust gas purifier.

2. An overheat preventing system for exhaust gas purifier of a vehicle comprising:
    a temperature detector inserted in the locality of each of a plurality of engine exhaust ports;
    an overheat detector means for detecting failure of an engine to fire from signals from said temperature detectors to produce a signal, said overheat detector means generating temperature signals corresponding to the temperature in the locality of said exhaust ports, and a reference temperature signal produced from an engine rpm signal, said reference temperature signal representing a number of engine revolutions corresponding to a temperature in the locality of said exhaust ports which indicates the occurrence of a misfire, whereby each of said temperature signals is compared with said reference temperature signal so that when said reference temperature signal becomes higher than said temperature signal, the occurrence of a misfire and hence the generation of unburned gases is detected to generate an overheat signal; and
    means responsive to said signal generated from said overheat detector means to prevent unburned gases from flowing into an exhaust gas purifier.

3. An overheat preventing system according to claim 1, wherein said means for preventing unburned gases from flowing into an exhaust gas purifier comprise means for closing the throttle valve of a carburetor.

4. An overheat preventing system according to claim 2, wherein said means for preventing unburned gases from flowing into an exhaust gas purifier comprise means for closing the throttle valve of a carburetor.

5. An overheat preventing system according to claim 1, wherein said means for preventing unburned gases from flowing into an exhaust gas purifier comprise means for moving a bypass valve for a converter from one position to another.

6. An overheat preventing system according to claim 2, wherein said means for preventingg unburned gases from flowing into an exhaust gas purifier comprise means for moving a bypass valve for a converter from one position to another.

7. An overheat preventing system according to claim 3, wherein said means for preventing unburned gases from flowing into an exhaust gas purifier further include means for moving a bypass valve for a converter from one position to another.

8. An overheat preventing system according to claim 4, wherein said means for preventing unburned gases from flowing into an exhaust gas purifier further include means for moving a bypass valve for a converter from one position to another.

9. An overheat prevention system for an exhaust gas purifier in an internal combustion engine having a plurality of engine exhaust ports and an ignition circuit for producing an engine rpm signal comprising:
    a temperature detector inserted in the vicinity of each of the engine exhaust ports for detecting the temperature in the vicinity of the engine exhaust ports and for producing an output signal representing the detected temperature;
    an overheat detector means connected to receive the output signals of said temperature detectors and the engine rpm signal of said ignition circuit,
    said overheat detector means including,
    a reference signal circuit for generating a reference signal in response to the engine rpm signal, and
    a comparing circuit connected to said reference signal circuit for comparing the reference signal with each of the output signals of said temperature detectors and for generating a misfire signal when the output signal is smaller than the reference signal; and
    means responsive to the misfire signal from said overheat detector for preventing unburned gases produced in the exhaust gases of the engine due to the failure to fire from flowing into an exhaust gas purifier.

10. An overheat prevention system according to claim 9, wherein said ignition circuit produces a pulse signal corresponding to the engine rpm signal, and
    said reference temperature signal circuit comprises a conversion circuit for generating a reference signal of a D.C. voltage in response to the pulse signal.

11. An overheat prevention system for an exhaust gas purifier in an internal combustion engine having a plurality of engine exhaust ports and an ignition system for producing an ignition pulse signal comprising:
    a temperature detector inserted in the vicinity of each of the engine exhaust ports for detecting the temperature in the vicinity of the engine exhaust port and for producing an output signal representing the detected temperature;
    a control circuit connected to receive the output signal of said temperature detector and the ignition pulse signal of said ignition system, said control circuit including,
    a temperature difference detecting circuit connected to receive signals from two of said temperature detectors for detecting a temperature difference therebetween,
    a first comparing circuit connected to said temperature difference detecting circuit for comparing an output signal from said temperature difference circuit representing the temperature difference with a reference signal having a first predetermined value and for producing an output signal having different levels depending on whether the temperature difference exceeds the first predetermined value or not, a highpass filter circuit to receive the ignition pulse signal and to convert the ignition pulse signal into a differential pulse signal, an integrating circuit connected to said highpass filter circuit for generating an integrated voltage signal by integrating the differential pulse signal, a second comparing circuit connected to said integrating circuit for generating an output signal identifying whether the integrated voltage signal does not exceed a second predetermined value or not, and a decision circuit connected to said first and second comparing circuits and responsive to said output signals of said respective first and second comparing circuits for generating a misfire signal when the temperature difference signal exceeds the first predetermined value or the integrated voltage signal does not exceed the second predetermined value; and means responsive to the misfire signal from said decision circuit for preventing unburned gases produced in the exhaust gases of the engine due to the failure to fire from flowing into an exhaust gas purifier.

12. An overheat preventing system according to claim 11, wherein the ignition pulse signal is a pulse signal generated by a high tension cord of said ignition system.

13. An overheat prevention system for an exhaust gas purifier in an internal combustion engine having a plurality of engine exhaust ports and an ignition system for producing an ignition pulse signal comprising:

a temperature detector inserted in the vicinity of each of the engine exhaust ports for detecting the temperature in the vicinity of the engine exhaust port and for producing an output signal representing the detected temperature;

a control circuit connected to receive the output signal of said temperature detector, said control circuit including, a temperature difference detecting circuit connected to receive signals from two of said temperature detectors for detecting a temperature difference therebetween, and a comparing circuit connected to said temperature difference detecting circuit for comparing an output signal from said temperature difference circuit representing the temperature difference with a reference signal having a predetermined value and for producing an output signal having different levels depending on whether the temperature difference exceeds the predetermined value or not, said control circuit being further connected to receive ignition pulse signal of said ignition system, said control circuit further including, a check circuit for detecting, depending on the ignition, pulse signal failure of all the cylinders of said engine to fire and for generating an output signal, and a decision circuit connected to said comparing circuit and said check circuit for generating a misfire signal in response to the output signals of said comparing circuit and said check circuit; and means responsive to the misfire signal from said control circuit for preventing unburned gases produced in the exhaust gases of the engine due to the failure to fire from flowing into an exhaust gas purifier.

14. An overheat preventing system according to claim 13, wherein said means for preventing unburned gases from flowing into an exhaust gas purifier comprise means for moving a bypass valve for a converter from one position to another.

15. An overheat preventing system according to claim 13, said means for preventing unburned gases from flowing into an exhaust gas purifier comprise means for closing the throttle valve of a carburetor.

16. An overheat preventing system according to claim 13, wherein said control circuit further detects a time rate of change of the temperature from said temperature signal from one of said temperature detectors, whereby when said temperature change rate exceeds a predetermined value, the generation of unburned gases which would cause an overheat is also detected to generate an overheat signal.

* * * * *